US011822333B2

(12) United States Patent
Jazayeri et al.

(10) Patent No.: US 11,822,333 B2
(45) Date of Patent: Nov. 21, 2023

(54) METHOD, SYSTEM AND APPARATUS FOR DATA CAPTURE ILLUMINATION CONTROL

(71) Applicant: ZEBRA TECHNOLOGIES CORPORATION, Lincolnshire, IL (US)

(72) Inventors: Ali Jazayeri, Mississauga (CA); Sadegh Tajeddin, Mississauga (CA); Bijan Sakhdari, Waterloo (CA)

(73) Assignee: Zebra Technologies Corporation, Lincolnshire, IL (US)

( * ) Notice: Subject to any disclaimer, the term of this patent is extended or adjusted under 35 U.S.C. 154(b) by 108 days.

(21) Appl. No.: 16/834,949

(22) Filed: Mar. 30, 2020

(65) Prior Publication Data
US 2021/0302976 A1      Sep. 30, 2021

(51) Int. Cl.
*G05D 1/02*      (2020.01)
*G01C 21/20*      (2006.01)

(52) U.S. Cl.
CPC ......... *G05D 1/0214* (2013.01); *G01C 21/206* (2013.01); *G05D 1/0238* (2013.01); *G05D 2201/0216* (2013.01)

(58) Field of Classification Search
CPC ............... G05D 1/0214; G05D 1/0238; G05D 2201/0216; G05D 1/024; G05D 1/0274; G05D 1/0246; G01C 21/206; G06T 2207/30252; G06T 7/70; G06T 7/50; G06T 2207/10016; G06T 7/20; G06T 7/0002; G06T 7/55; G06T 7/62; G06T 15/50; G06T 2207/30088; G06T 2207/30204;
(Continued)

(56) References Cited

U.S. PATENT DOCUMENTS 5,209,712 A      5/1993 Ferri
5,214,615 A      5/1993 Bauer
(Continued)

FOREIGN PATENT DOCUMENTS

CA      2835830      11/2012
CA      3028156      1/2018
(Continued)

OTHER PUBLICATIONS

"Fair Billing with Automatic Dimensioning" pp. 1-4, undated, Copyright Mettler-Toledo International Inc.
(Continued)

*Primary Examiner* — Rachid Bendidi
*Assistant Examiner* — Ibrahim Abdoalatif Alsomairy

(57)      ABSTRACT

A method in a navigational controller includes: obtaining image data and depth data from corresponding sensors of a mobile automation apparatus; detecting an obstacle from the depth data and classifying the obstacle as one of a human obstacle and a non-human obstacle; in response to the classifying of the obstacle as the human obstacle, selecting a portion of the image data that corresponds to the obstacle; detecting, from the selected image data, a feature of the obstacle; based on a detected position of the detected feature, selecting an illumination control action; and controlling an illumination subsystem of the mobile automation apparatus according to the selected illumination control action.

16 Claims, 11 Drawing Sheets

(58) Field of Classification Search
CPC ..... G06T 2207/30196–30201; B60R 21/0134; G01J 5/0859; G06V 40/10; G06K 9/00221–00389; H04N 5/23219; H04N 21/4223; H04N 21/44218; G06F 17/30793; A61B 5/1176

See application file for complete search history.

(56) References Cited

U.S. PATENT DOCUMENTS

| | | | |
|---|---|---|---|
| 5,408,322 A | 4/1995 | Hsu et al. | |
| 5,414,268 A | 5/1995 | McGee | |
| 5,423,617 A | 6/1995 | Marsh et al. | |
| 5,534,762 A | 7/1996 | Kim | |
| 5,566,280 A | 10/1996 | Fukui et al. | |
| 5,704,049 A | 12/1997 | Briechle | |
| 5,953,055 A | 9/1999 | Huang et al. | |
| 5,988,862 A | 11/1999 | Kacyra et al. | |
| 6,026,376 A | 2/2000 | Kenney | |
| 6,034,379 A | 3/2000 | Bunte et al. | |
| 6,075,905 A | 6/2000 | Herman et al. | |
| 6,115,114 A | 9/2000 | Berg et al. | |
| 6,141,293 A | 10/2000 | Amorai-Moriya et al. | |
| 6,304,855 B1 | 10/2001 | Burke | |
| 6,442,507 B1 | 8/2002 | Skidmore et al. | |
| 6,549,825 B2 | 4/2003 | Kurata | |
| 6,580,441 B2 | 6/2003 | Schileru-Key | |
| 6,711,293 B1 | 3/2004 | Lowe | |
| 6,721,723 B1 | 4/2004 | Gibson et al. | |
| 6,721,769 B1 | 4/2004 | Rappaport et al. | |
| 6,836,567 B1 | 12/2004 | Silver et al. | |
| 6,995,762 B1 | 2/2006 | Pavlidis et al. | |
| 7,090,135 B2 | 8/2006 | Patel | |
| 7,137,207 B2 | 11/2006 | Armstrong et al. | |
| 7,245,558 B2 | 7/2007 | Willins et al. | |
| 7,248,754 B2 | 7/2007 | Cato | |
| 7,277,187 B2 | 10/2007 | Smith et al. | |
| 7,373,722 B2 | 5/2008 | Cooper et al. | |
| 7,474,389 B2 | 1/2009 | Greenberg et al. | |
| 7,487,595 B2 | 2/2009 | Armstrong et al. | |
| 7,493,336 B2 | 2/2009 | Noonan | |
| 7,508,794 B2 | 3/2009 | Feather et al. | |
| 7,527,205 B2 | 5/2009 | Zhu et al. | |
| 7,605,817 B2 | 10/2009 | Zhang et al. | |
| 7,647,752 B2 | 1/2010 | Magnell | |
| 7,693,757 B2 | 4/2010 | Zimmerman | |
| 7,726,575 B2 | 6/2010 | Wang et al. | |
| 7,751,928 B1 | 7/2010 | Antony et al. | |
| 7,783,383 B2 | 8/2010 | Eliuk et al. | |
| 7,839,531 B2 | 11/2010 | Sugiyama | |
| 7,845,560 B2 | 12/2010 | Emanuel et al. | |
| 7,885,865 B2 | 2/2011 | Benson et al. | |
| 7,925,114 B2 | 4/2011 | Mai et al. | |
| 7,957,998 B2 | 6/2011 | Riley et al. | |
| 7,996,179 B2 | 8/2011 | Lee et al. | |
| 8,009,864 B2 | 8/2011 | Linaker et al. | |
| 8,049,621 B1 | 11/2011 | Egan | |
| 8,091,782 B2 | 1/2012 | Cato et al. | |
| 8,094,902 B2 | 1/2012 | Crandall et al. | |
| 8,094,937 B2 | 1/2012 | Teoh et al. | |
| 8,132,728 B2 | 3/2012 | Dwinell et al. | |
| 8,134,717 B2 | 3/2012 | Pangrazio et al. | |
| 8,189,855 B2 | 5/2012 | Opalach et al. | |
| 8,199,977 B2 | 6/2012 | Krishnaswamy et al. | |
| 8,207,964 B1 | 6/2012 | Meadow et al. | |
| 8,233,055 B2 | 7/2012 | Matsunaga et al. | |
| 8,260,742 B2 | 9/2012 | Cognigni et al. | |
| 8,265,895 B2 | 9/2012 | Willins et al. | |
| 8,277,396 B2 | 10/2012 | Scott et al. | |
| 8,284,988 B2 | 10/2012 | Sones et al. | |
| 8,423,431 B1 | 4/2013 | Rouaix et al. | |
| 8,429,004 B2 | 4/2013 | Hamilton et al. | |
| 8,463,079 B2 | 6/2013 | Ackley et al. | |
| 8,479,996 B2 | 7/2013 | Barkan et al. | |
| 8,520,067 B2 | 8/2013 | Ersue | |
| 8,542,252 B2 | 9/2013 | Perez et al. | |
| 8,571,314 B2 | 10/2013 | Tao et al. | |
| 8,599,303 B2 | 12/2013 | Stettner | |
| 8,630,924 B2 | 1/2014 | Groenevelt et al. | |
| 8,660,338 B2 | 2/2014 | Ma et al. | |
| 8,743,176 B2 | 6/2014 | Stettner et al. | |
| 8,757,479 B2 | 6/2014 | Clark et al. | |
| 8,812,226 B2 | 8/2014 | Zeng | |
| 8,923,893 B2 | 12/2014 | Austin et al. | |
| 8,939,369 B2 | 1/2015 | Olmstead et al. | |
| 8,954,188 B2 | 2/2015 | Sullivan et al. | |
| 8,958,911 B2 | 2/2015 | Wong et al. | |
| 8,971,637 B1 | 3/2015 | Rivard | |
| 8,989,342 B2 | 3/2015 | Liesenfelt et al. | |
| 9,007,601 B2 | 4/2015 | Steffey et al. | |
| 9,037,287 B1 | 5/2015 | Grauberger et al. | |
| 9,064,394 B1 | 6/2015 | Trundle | |
| 9,070,285 B1 | 6/2015 | Ramu et al. | |
| 9,072,929 B1 | 7/2015 | Rush et al. | |
| 9,120,622 B1 | 9/2015 | Elazary et al. | |
| 9,129,277 B2 | 9/2015 | Macintosh | |
| 9,135,491 B2 | 9/2015 | Morandi et al. | |
| 9,159,047 B2 | 10/2015 | Winkel | |
| 9,171,442 B2 | 10/2015 | Clements | |
| 9,247,211 B2 | 1/2016 | Zhang et al. | |
| 9,329,269 B2 | 5/2016 | Zeng | |
| 9,349,076 B1 | 5/2016 | Liu et al. | |
| 9,367,831 B1 | 6/2016 | Besehanic | |
| 9,380,222 B2 | 6/2016 | Clayton et al. | |
| 9,396,554 B2 | 7/2016 | Williams et al. | |
| 9,400,170 B2 | 7/2016 | Steffey | |
| 9,424,482 B2 | 8/2016 | Patel et al. | |
| 9,446,765 B2 * | 9/2016 | Ben Shalom | G08G 1/165 |
| 9,517,767 B1 | 12/2016 | Kentley et al. | |
| 9,542,746 B2 | 1/2017 | Wu et al. | |
| 9,549,125 B1 | 1/2017 | Goyal et al. | |
| 9,562,971 B2 | 2/2017 | Shenkar et al. | |
| 9,565,400 B1 | 2/2017 | Curlander et al. | |
| 9,589,353 B2 | 3/2017 | Mueller-Fischer et al. | |
| 9,600,731 B2 | 3/2017 | Yasunaga et al. | |
| 9,600,892 B2 | 3/2017 | Patel et al. | |
| 9,612,123 B1 | 4/2017 | Levinson et al. | |
| 9,639,935 B1 | 5/2017 | Douady-Pleven et al. | |
| 9,697,429 B2 | 7/2017 | Patel et al. | |
| 9,766,074 B2 | 9/2017 | Roumeliotis et al. | |
| 9,778,388 B1 | 10/2017 | Connor | |
| 9,779,205 B2 | 10/2017 | Namir | |
| 9,791,862 B1 | 10/2017 | Connor | |
| 9,805,240 B1 | 10/2017 | Zheng et al. | |
| 9,811,754 B2 | 11/2017 | Schwartz | |
| 9,827,683 B1 | 11/2017 | Hance et al. | |
| 9,880,009 B2 | 1/2018 | Bell | |
| 9,928,708 B2 | 3/2018 | Lin et al. | |
| 9,953,420 B2 | 4/2018 | Wolski et al. | |
| 9,980,009 B2 | 5/2018 | Jiang et al. | |
| 9,994,339 B2 | 6/2018 | Colson et al. | |
| 9,996,818 B1 | 6/2018 | Ren et al. | |
| 10,019,803 B2 | 7/2018 | Venable et al. | |
| 10,111,646 B2 | 10/2018 | Nycz et al. | |
| 10,121,072 B1 | 11/2018 | Kekatpure | |
| 10,127,438 B1 | 11/2018 | Fisher et al. | |
| 10,133,951 B1 | 11/2018 | Mendonca et al. | |
| 10,197,400 B2 | 2/2019 | Jesudason et al. | |
| 10,210,603 B2 | 2/2019 | Venable et al. | |
| 10,229,386 B2 | 3/2019 | Thomas | |
| 10,248,653 B2 | 4/2019 | Blassin et al. | |
| 10,262,294 B1 | 4/2019 | Hahn et al. | |
| 10,265,871 B2 | 4/2019 | Hance et al. | |
| 10,289,990 B2 | 5/2019 | Rizzolo et al. | |
| 10,336,543 B1 | 7/2019 | Sills et al. | |
| 10,349,031 B2 | 7/2019 | DeLuca | |
| 10,352,689 B2 | 7/2019 | Brown et al. | |
| 10,373,116 B2 | 8/2019 | Medina et al. | |
| 10,394,244 B2 | 8/2019 | Song et al. | |
| 10,429,487 B1 | 10/2019 | Fowe | |
| 11,003,188 B2 | 5/2021 | Scott et al. | |
| 2001/0031069 A1 | 10/2001 | Kondo et al. | |
| 2001/0041948 A1 | 11/2001 | Ross et al. | |
| 2002/0006231 A1 | 1/2002 | Jayant et al. | |
| 2002/0059202 A1 | 5/2002 | Hadzikadic et al. | |

(56) References Cited

U.S. PATENT DOCUMENTS

| | | |
|---|---|---|
| 2002/0097439 A1 | 7/2002 | Braica |
| 2002/0146170 A1 | 10/2002 | Rom |
| 2002/0158453 A1 | 10/2002 | Levine |
| 2002/0164236 A1 | 11/2002 | Fukuhara et al. |
| 2003/0003925 A1 | 1/2003 | Suzuki |
| 2003/0094494 A1 | 5/2003 | Blanford et al. |
| 2003/0174891 A1 | 9/2003 | Wenzel et al. |
| 2004/0021313 A1 | 2/2004 | Gardner et al. |
| 2004/0084527 A1 | 5/2004 | Bong et al. |
| 2004/0131278 A1 | 7/2004 | Imagawa et al. |
| 2004/0240754 A1 | 12/2004 | Smith et al. |
| 2005/0016004 A1 | 1/2005 | Armstrong et al. |
| 2005/0114059 A1 | 5/2005 | Chang et al. |
| 2005/0128195 A1 | 6/2005 | Houston et al. |
| 2005/0174351 A1 | 8/2005 | Chang |
| 2005/0213082 A1 | 9/2005 | DiBernardo et al. |
| 2005/0213109 A1 | 9/2005 | Schell et al. |
| 2005/0237320 A1 | 10/2005 | Itoh et al. |
| 2006/0032915 A1 | 2/2006 | Schwartz |
| 2006/0045325 A1 | 3/2006 | Zavadsky et al. |
| 2006/0064286 A1 | 3/2006 | Fink et al. |
| 2006/0106742 A1 | 5/2006 | Bochicchio et al. |
| 2006/0279527 A1 | 12/2006 | Zehner et al. |
| 2006/0285486 A1 | 12/2006 | Roberts et al. |
| 2007/0036398 A1 | 2/2007 | Chen |
| 2007/0074410 A1 | 4/2007 | Armstrong et al. |
| 2007/0272732 A1 | 11/2007 | Hindmon |
| 2008/0002866 A1 | 1/2008 | Fujiwara |
| 2008/0025565 A1 | 1/2008 | Zhang et al. |
| 2008/0027591 A1 | 1/2008 | Lenser et al. |
| 2008/0077511 A1 | 3/2008 | Zimmerman |
| 2008/0159634 A1 | 7/2008 | Sharma et al. |
| 2008/0164310 A1 | 7/2008 | Dupuy et al. |
| 2008/0175513 A1 | 7/2008 | Lai et al. |
| 2008/0181529 A1 | 7/2008 | Michel et al. |
| 2008/0183730 A1 | 7/2008 | Enga |
| 2008/0238919 A1 | 10/2008 | Pack |
| 2008/0294487 A1 | 11/2008 | Nasser |
| 2009/0009123 A1 | 1/2009 | Skaff |
| 2009/0024353 A1 | 1/2009 | Lee et al. |
| 2009/0057411 A1 | 3/2009 | Madej et al. |
| 2009/0059270 A1 | 3/2009 | Opalach et al. |
| 2009/0060349 A1 | 3/2009 | Linaker et al. |
| 2009/0063306 A1 | 3/2009 | Fano et al. |
| 2009/0063307 A1 | 3/2009 | Groenovelt et al. |
| 2009/0074303 A1 | 3/2009 | Filimonova et al. |
| 2009/0088975 A1 | 4/2009 | Sato et al. |
| 2009/0103773 A1 | 4/2009 | Wheeler et al. |
| 2009/0125350 A1 | 5/2009 | Lessing et al. |
| 2009/0125535 A1 | 5/2009 | Basso et al. |
| 2009/0152391 A1 | 6/2009 | McWhirk |
| 2009/0160975 A1 | 6/2009 | Kwan |
| 2009/0192921 A1 | 7/2009 | Hicks |
| 2009/0206161 A1 | 8/2009 | Olmstead |
| 2009/0236155 A1 | 9/2009 | Skaff |
| 2009/0252437 A1 | 10/2009 | Li et al. |
| 2009/0287587 A1 | 11/2009 | Bloebaum et al. |
| 2009/0323121 A1 | 12/2009 | Valkenburg et al. |
| 2010/0017407 A1 | 1/2010 | Beniyama et al. |
| 2010/0026804 A1 | 2/2010 | Tanizaki et al. |
| 2010/0070365 A1 | 3/2010 | Siotia et al. |
| 2010/0082194 A1 | 4/2010 | Yabushita et al. |
| 2010/0091094 A1 | 4/2010 | Sekowski |
| 2010/0118116 A1 | 5/2010 | Tomasz et al. |
| 2010/0131234 A1 | 5/2010 | Stewart et al. |
| 2010/0141806 A1 | 6/2010 | Uemura et al. |
| 2010/0161569 A1 | 6/2010 | Schreter |
| 2010/0171826 A1 | 7/2010 | Hamilton et al. |
| 2010/0208039 A1 | 8/2010 | Setettner |
| 2010/0214873 A1 | 8/2010 | Somasundaram et al. |
| 2010/0235033 A1 | 9/2010 | Yamamoto et al. |
| 2010/0241289 A1 | 9/2010 | Sandberg |
| 2010/0257149 A1 | 10/2010 | Cognigni et al. |
| 2010/0295850 A1 | 11/2010 | Katz et al. |
| 2010/0315412 A1 | 12/2010 | Sinha et al. |
| 2010/0326939 A1 | 12/2010 | Clark et al. |
| 2011/0047636 A1 | 2/2011 | Stachon et al. |
| 2011/0052043 A1 | 3/2011 | Hyung et al. |
| 2011/0093306 A1 | 4/2011 | Nielsen et al. |
| 2011/0137527 A1 | 6/2011 | Simon et al. |
| 2011/0168774 A1 | 7/2011 | Magal |
| 2011/0172875 A1 | 7/2011 | Gibbs |
| 2011/0188759 A1 | 8/2011 | Filimonova et al. |
| 2011/0216063 A1 | 9/2011 | Hayes |
| 2011/0242286 A1 | 10/2011 | Pace et al. |
| 2011/0246503 A1 | 10/2011 | Bender et al. |
| 2011/0254840 A1 | 10/2011 | Halstead |
| 2011/0286007 A1 | 11/2011 | Pangrazio et al. |
| 2011/0288816 A1 | 11/2011 | Thierman |
| 2011/0310088 A1 | 12/2011 | Adabala et al. |
| 2012/0017028 A1 | 1/2012 | Tsirkin |
| 2012/0019393 A1 | 1/2012 | Wolinsky et al. |
| 2012/0022913 A1 | 1/2012 | VolKmann et al. |
| 2012/0051730 A1 | 3/2012 | Cote et al. |
| 2012/0069051 A1 | 3/2012 | Hagbi et al. |
| 2012/0075342 A1 | 3/2012 | Choubassi et al. |
| 2012/0133639 A1 | 5/2012 | Kopf et al. |
| 2012/0307108 A1 | 6/2012 | Forutanpour |
| 2012/0169530 A1 | 7/2012 | Padmanabhan et al. |
| 2012/0179621 A1 | 7/2012 | Moir et al. |
| 2012/0182392 A1* | 7/2012 | Kearns .................. B25J 19/023<br>348/46 |
| 2012/0185112 A1 | 7/2012 | Sung et al. |
| 2012/0194644 A1 | 8/2012 | Newcombe et al. |
| 2012/0197464 A1 | 8/2012 | Wang et al. |
| 2012/0201466 A1 | 8/2012 | Funayama et al. |
| 2012/0209553 A1 | 8/2012 | Doytchinov et al. |
| 2012/0236119 A1 | 9/2012 | Rhee et al. |
| 2012/0249802 A1 | 10/2012 | Taylor |
| 2012/0250978 A1 | 10/2012 | Taylor |
| 2012/0269383 A1 | 10/2012 | Bobbitt et al. |
| 2012/0278782 A1 | 11/2012 | Pal et al. |
| 2012/0287249 A1 | 11/2012 | Choo et al. |
| 2012/0323620 A1 | 12/2012 | Hofman et al. |
| 2013/0030700 A1 | 1/2013 | Miller et al. |
| 2013/0076586 A1 | 3/2013 | Karhuketo et al. |
| 2013/0090881 A1 | 4/2013 | Janardhanan et al. |
| 2013/0119138 A1 | 5/2013 | Winkel |
| 2013/0132913 A1 | 5/2013 | Fu et al. |
| 2013/0134178 A1 | 5/2013 | Lu |
| 2013/0138246 A1 | 5/2013 | Gutmann et al. |
| 2013/0138534 A1 | 5/2013 | Herwig |
| 2013/0142421 A1 | 6/2013 | Silver et al. |
| 2013/0144565 A1 | 6/2013 | Miller |
| 2013/0154802 A1 | 6/2013 | O'Haire et al. |
| 2013/0156292 A1 | 6/2013 | Chang et al. |
| 2013/0162806 A1 | 6/2013 | Ding et al. |
| 2013/0169681 A1 | 7/2013 | Rasane et al. |
| 2013/0176398 A1 | 7/2013 | Bonner et al. |
| 2013/0178227 A1 | 7/2013 | Vartanian et al. |
| 2013/0182114 A1 | 7/2013 | Zhang et al. |
| 2013/0226344 A1 | 8/2013 | Wong et al. |
| 2013/0228620 A1 | 9/2013 | Ahem et al. |
| 2013/0232039 A1 | 9/2013 | Jackson et al. |
| 2013/0235165 A1 | 9/2013 | Gharib et al. |
| 2013/0235206 A1 | 9/2013 | Smith et al. |
| 2013/0236089 A1 | 9/2013 | Litvak et al. |
| 2013/0278631 A1 | 10/2013 | Border et al. |
| 2013/0299306 A1 | 11/2013 | Jiang et al. |
| 2013/0299313 A1 | 11/2013 | Baek, IV et al. |
| 2013/0300729 A1 | 11/2013 | Grimaud |
| 2013/0303193 A1 | 11/2013 | Dharwada et al. |
| 2013/0321418 A1 | 12/2013 | Kirk |
| 2013/0329013 A1 | 12/2013 | Metois et al. |
| 2013/0341400 A1 | 12/2013 | Lancaster-Larocque |
| 2013/0342363 A1 | 12/2013 | Paek et al. |
| 2014/0002597 A1 | 1/2014 | Taguchi et al. |
| 2014/0003655 A1 | 1/2014 | Gopalkrishnan et al. |
| 2014/0003727 A1 | 1/2014 | Lortz et al. |
| 2014/0006229 A1 | 1/2014 | Birch et al. |
| 2014/0016832 A1 | 1/2014 | Kong et al. |
| 2014/0019311 A1 | 1/2014 | Tanaka |
| 2014/0025201 A1 | 1/2014 | Ryu et al. |
| 2014/0028837 A1 | 1/2014 | Gao et al. |

(56) References Cited

U.S. PATENT DOCUMENTS

| | | |
|---|---|---|
| 2014/0047342 A1 | 2/2014 | Breternitz et al. |
| 2014/0049616 A1 | 2/2014 | Stettner |
| 2014/0052555 A1 | 2/2014 | Macintosh |
| 2014/0086483 A1 | 3/2014 | Zhang et al. |
| 2014/0088761 A1 | 3/2014 | Shamlian et al. |
| 2014/0098094 A1 | 4/2014 | Neumann et al. |
| 2014/0100813 A1 | 4/2014 | Shaowering |
| 2014/0103212 A1* | 4/2014 | Damarla .............. G08B 13/193 250/340 |
| 2014/0104413 A1 | 4/2014 | McCloskey et al. |
| 2014/0112537 A1 | 4/2014 | Frank et al. |
| 2014/0129027 A1 | 5/2014 | Schnittman |
| 2014/0133740 A1 | 5/2014 | Plagemann et al. |
| 2014/0156133 A1 | 6/2014 | Cullinane et al. |
| 2014/0161359 A1 | 6/2014 | Magri et al. |
| 2014/0192050 A1 | 7/2014 | Qiu et al. |
| 2014/0195095 A1 | 7/2014 | Flohr et al. |
| 2014/0195374 A1 | 7/2014 | Bassemir et al. |
| 2014/0214547 A1 | 7/2014 | Signorelli et al. |
| 2014/0214600 A1 | 7/2014 | Argue et al. |
| 2014/0267614 A1 | 9/2014 | Ding et al. |
| 2014/0267688 A1 | 9/2014 | Aich et al. |
| 2014/0277691 A1 | 9/2014 | Jacobus et al. |
| 2014/0277692 A1 | 9/2014 | Buzan et al. |
| 2014/0279294 A1 | 9/2014 | Field-Darragh et al. |
| 2014/0300637 A1 | 10/2014 | Fan et al. |
| 2014/0316875 A1 | 10/2014 | Tkachenko et al. |
| 2014/0330835 A1 | 11/2014 | Boyer |
| 2014/0344401 A1 | 11/2014 | Varney et al. |
| 2014/0351073 A1 | 11/2014 | Murphy et al. |
| 2014/0369607 A1 | 12/2014 | Patel et al. |
| 2015/0015602 A1 | 1/2015 | Beaudoin |
| 2015/0019391 A1 | 1/2015 | Kumar et al. |
| 2015/0029339 A1 | 1/2015 | Kobres et al. |
| 2015/0032304 A1 | 1/2015 | Nakamura et al. |
| 2015/0039458 A1 | 2/2015 | Reid |
| 2015/0052029 A1 | 2/2015 | Wu et al. |
| 2015/0088618 A1 | 3/2015 | Basir et al. |
| 2015/0088701 A1 | 3/2015 | Desmarais et al. |
| 2015/0088703 A1 | 3/2015 | Yan |
| 2015/0092066 A1 | 4/2015 | Geiss et al. |
| 2015/0106403 A1 | 4/2015 | Haverinen et al. |
| 2015/0117788 A1 | 4/2015 | Patel et al. |
| 2015/0139010 A1 | 5/2015 | Jeong et al. |
| 2015/0154467 A1 | 6/2015 | Feng et al. |
| 2015/0161793 A1 | 6/2015 | Takahashi |
| 2015/0170256 A1 | 6/2015 | Pettyjohn et al. |
| 2015/0181198 A1 | 6/2015 | Baele et al. |
| 2015/0195491 A1 | 7/2015 | Shaburov et al. |
| 2015/0212521 A1 | 7/2015 | Pack et al. |
| 2015/0235157 A1 | 8/2015 | Avegliano et al. |
| 2015/0243073 A1 | 8/2015 | Chen et al. |
| 2015/0245358 A1 | 8/2015 | Schmidt |
| 2015/0262116 A1 | 9/2015 | Katircioglu et al. |
| 2015/0279035 A1 | 10/2015 | Wolski et al. |
| 2015/0298317 A1 | 10/2015 | Wang et al. |
| 2015/0310348 A1 | 10/2015 | Dessouky et al. |
| 2015/0310601 A1 | 10/2015 | Rodriguez et al. |
| 2015/0332368 A1 | 11/2015 | Vartiainen et al. |
| 2015/0352721 A1 | 12/2015 | Wicks et al. |
| 2015/0353280 A1 | 12/2015 | Brazeau et al. |
| 2015/0355639 A1 | 12/2015 | Versteeg et al. |
| 2015/0363625 A1 | 12/2015 | Wu et al. |
| 2015/0363758 A1 | 12/2015 | Wu et al. |
| 2015/0365660 A1 | 12/2015 | Wu et al. |
| 2015/0379704 A1 | 12/2015 | Chandrasekar et al. |
| 2016/0026253 A1 | 1/2016 | Bradski et al. |
| 2016/0042223 A1 | 2/2016 | Suh et al. |
| 2016/0044862 A1 | 2/2016 | Kocer |
| 2016/0061591 A1 | 3/2016 | Pangrazio et al. |
| 2016/0070981 A1 | 3/2016 | Sasaki et al. |
| 2016/0092943 A1 | 3/2016 | Vigier et al. |
| 2016/0012588 A1 | 4/2016 | Taguchi et al. |
| 2016/0104041 A1 | 4/2016 | bowers et al. |
| 2016/0107690 A1 | 4/2016 | Oyama et al. |
| 2016/0112628 A1 | 4/2016 | Super et al. |
| 2016/0114488 A1 | 4/2016 | Mascorro Medina et al. |
| 2016/0129592 A1 | 5/2016 | Saboo et al. |
| 2016/0132815 A1 | 5/2016 | Itoko et al. |
| 2016/0150217 A1 | 5/2016 | Popov |
| 2016/0156898 A1 | 6/2016 | Ren et al. |
| 2016/0163067 A1 | 6/2016 | Williams et al. |
| 2016/0171336 A1 | 6/2016 | Schwartz |
| 2016/0171429 A1 | 6/2016 | Schwartz |
| 2016/0171707 A1 | 6/2016 | Schwartz |
| 2016/0185347 A1 | 6/2016 | Lefevre et al. |
| 2016/0191759 A1 | 6/2016 | Somanath et al. |
| 2016/0224927 A1 | 8/2016 | Pettersson |
| 2016/0253735 A1 | 9/2016 | Scudillo et al. |
| 2016/0253844 A1 | 9/2016 | Petrovskaya et al. |
| 2016/0259329 A1 | 9/2016 | High et al. |
| 2016/0260051 A1 | 9/2016 | Wu et al. |
| 2016/0260054 A1 | 9/2016 | High et al. |
| 2016/0271795 A1 | 9/2016 | Vicenti |
| 2016/0290805 A1 | 10/2016 | Irish et al. |
| 2016/0313133 A1 | 10/2016 | Zeng et al. |
| 2016/0328618 A1 | 11/2016 | Patel et al. |
| 2016/0328767 A1 | 11/2016 | Bonner et al. |
| 2016/0353099 A1 | 12/2016 | Thomson et al. |
| 2016/0364634 A1 | 12/2016 | Davis et al. |
| 2017/0004649 A1 | 1/2017 | Collet Romea et al. |
| 2017/0011281 A1 | 1/2017 | Dijkman et al. |
| 2017/0011308 A1 | 1/2017 | Sun et al. |
| 2017/0030538 A1 | 2/2017 | Geisler et al. |
| 2017/0032311 A1 | 2/2017 | Rizzolo et al. |
| 2017/0041553 A1 | 2/2017 | Cao et al. |
| 2017/0054965 A1 | 2/2017 | Raab et al. |
| 2017/0066459 A1 | 3/2017 | Singh |
| 2017/0074659 A1 | 3/2017 | Giurgiu et al. |
| 2017/0083774 A1* | 3/2017 | Solar .................... G06V 10/764 |
| 2017/0084037 A1 | 3/2017 | Barajas Hernandez et al. |
| 2017/0109940 A1 | 4/2017 | Guo et al. |
| 2017/0147966 A1 | 5/2017 | Aversa et al. |
| 2017/0150129 A1 | 5/2017 | Pangrazio |
| 2017/0178060 A1 | 6/2017 | Schwartz |
| 2017/0178227 A1 | 6/2017 | Gornish |
| 2017/0178301 A1 | 6/2017 | Moraleda et al. |
| 2017/0178310 A1 | 6/2017 | Gornish |
| 2017/0193434 A1 | 7/2017 | Shah et al. |
| 2017/0205892 A1 | 7/2017 | Petrovskaya et al. |
| 2017/0219338 A1 | 8/2017 | Brown et al. |
| 2017/0219353 A1 | 8/2017 | Alesiani |
| 2017/0227645 A1 | 8/2017 | Swope et al. |
| 2017/0227647 A1 | 8/2017 | Baik |
| 2017/0228885 A1 | 8/2017 | Baumgartner |
| 2017/0261993 A1 | 9/2017 | Venable et al. |
| 2017/0262724 A1 | 9/2017 | Wu et al. |
| 2017/0280125 A1 | 9/2017 | Brown et al. |
| 2017/0286773 A1 | 10/2017 | Skaff et al. |
| 2017/0286901 A1 | 10/2017 | Skaff et al. |
| 2017/0297478 A1* | 10/2017 | Sherman ................ G06V 20/56 |
| 2017/0323253 A1 | 11/2017 | Enssle et al. |
| 2017/0323376 A1 | 11/2017 | Glaser et al. |
| 2017/0337508 A1 | 11/2017 | Bogolea et al. |
| 2017/0344016 A1 | 11/2017 | Chen et al. |
| 2018/0001481 A1 | 1/2018 | Shah et al. |
| 2018/0005035 A1 | 1/2018 | Bogolea et al. |
| 2018/0005176 A1 | 1/2018 | Williams et al. |
| 2018/0020145 A1 | 1/2018 | Kotfis et al. |
| 2018/0051991 A1 | 2/2018 | Hong |
| 2018/0053091 A1 | 2/2018 | Savvides et al. |
| 2018/0053305 A1 | 2/2018 | Gu et al. |
| 2018/0075403 A1 | 3/2018 | Mascorro Medina et al. |
| 2018/0089613 A1 | 3/2018 | Chen et al. |
| 2018/0101813 A1 | 4/2018 | Paat et al. |
| 2018/0108120 A1 | 4/2018 | Venable et al. |
| 2018/0108134 A1 | 4/2018 | Venable et al. |
| 2018/0114183 A1 | 4/2018 | Howell |
| 2018/0129201 A1 | 5/2018 | Douglas et al. |
| 2018/0130011 A1 | 5/2018 | Jacobsson |
| 2018/0143003 A1 | 5/2018 | Clayton et al. |
| 2018/0174325 A1 | 6/2018 | Fu et al. |
| 2018/0190160 A1 | 7/2018 | Bryan et al. |
| 2018/0197139 A1 | 7/2018 | Hill |

(56) References Cited

U.S. PATENT DOCUMENTS

| | | |
|---|---|---|
| 2018/0201423 A1 | 7/2018 | Drzewiecki et al. |
| 2018/0204111 A1 | 7/2018 | Zadeh et al. |
| 2018/0218218 A1 | 8/2018 | Madan et al. |
| 2018/0251253 A1 | 9/2018 | Taira et al. |
| 2018/0276596 A1 | 9/2018 | Murthy et al. |
| 2018/0281191 A1 | 10/2018 | Sinyayskiy et al. |
| 2018/0293442 A1 | 10/2018 | Fridental et al. |
| 2018/0293543 A1 | 10/2018 | Tiwari |
| 2018/0306958 A1 | 10/2018 | Goss et al. |
| 2018/0313956 A1 | 11/2018 | Rzeszutek et al. |
| 2018/0314260 A1 | 11/2018 | Jen et al. |
| 2018/0314908 A1 | 11/2018 | Lam |
| 2018/0315007 A1 | 11/2018 | Kingsford et al. |
| 2018/0315065 A1 | 11/2018 | Zhang et al. |
| 2018/0315173 A1 | 11/2018 | Phan et al. |
| 2018/0315865 A1 | 11/2018 | Haist et al. |
| 2018/0321692 A1 | 11/2018 | Castillo-Effen et al. |
| 2018/0370727 A1 | 12/2018 | Hance et al. |
| 2019/0025838 A1 | 1/2019 | Artes et al. |
| 2019/0034854 A1 | 1/2019 | Borodow et al. |
| 2019/0049962 A1 | 2/2019 | Ouellette et al. |
| 2019/0057588 A1 | 2/2019 | Savvides et al. |
| 2019/0065861 A1 | 2/2019 | Savvides et al. |
| 2019/0073554 A1 | 3/2019 | Rzeszutek |
| 2019/0073559 A1 | 3/2019 | Rzeszutek et al. |
| 2019/0073627 A1 | 3/2019 | Nakdimon et al. |
| 2019/0077015 A1 | 3/2019 | Shibasaki et al. |
| 2019/0087663 A1 | 3/2019 | Yamazaki et al. |
| 2019/0094876 A1 | 3/2019 | Moore et al. |
| 2019/0108606 A1 | 4/2019 | Komiyama |
| 2019/0108678 A1 | 4/2019 | Hazeghi et al. |
| 2019/0160675 A1 | 5/2019 | Paschal, II et al. |
| 2019/0178436 A1 | 6/2019 | Mao et al. |
| 2019/0180150 A1 | 6/2019 | Taylor et al. |
| 2019/0197439 A1 | 6/2019 | Wang |
| 2019/0197728 A1 | 6/2019 | Yamao |
| 2019/0236530 A1 | 8/2019 | Cantrell et al. |
| 2019/0271984 A1 | 9/2019 | Kingsford |
| 2019/0304132 A1 | 10/2019 | Yoda et al. |
| 2019/0359300 A1 | 11/2019 | Johnson et al. |
| 2019/0392212 A1 | 12/2019 | Sawhney et al. |
| 2020/0049511 A1 | 2/2020 | Sithiravel et al. |
| 2020/0053325 A1* | 2/2020 | Deyle .................. G05D 1/0088 |
| 2020/0064483 A1 | 2/2020 | Li et al. |
| 2020/0068126 A1 | 2/2020 | Fink et al. |
| 2020/0111267 A1 | 4/2020 | Stauber et al. |
| 2020/0118064 A1 | 4/2020 | Perrella et al. |
| 2020/0150655 A1 | 5/2020 | Artes et al. |
| 2020/0192388 A1 | 6/2020 | Zhang et al. |
| 2020/0314333 A1 | 10/2020 | Liang et al. |
| 2020/0341151 A1 | 10/2020 | Yoshida |
| 2020/0410766 A1 | 12/2020 | Swaminathan |
| 2021/0019939 A1 | 1/2021 | Hu et al. |
| 2021/0046861 A1* | 2/2021 | Li ............................ G06T 7/11 |
| 2021/0146552 A1 | 5/2021 | Hong et al. |
| 2021/0163068 A1 | 6/2021 | Zhu et al. |
| 2021/0233305 A1 | 7/2021 | Garcia et al. |
| 2021/0271238 A1 | 9/2021 | Ko et al. |

FOREIGN PATENT DOCUMENTS

| | | |
|---|---|---|
| CN | 102214343 | 10/2011 |
| CN | 104200086 | 12/2014 |
| CN | 105989512 | 10/2016 |
| CN | 107067382 | 8/2017 |
| CN | 206952978 | 2/2018 |
| EP | 766098 | 4/1997 |
| EP | 1311993 | 5/2007 |
| EP | 2309378 | 4/2011 |
| EP | 2439487 | 4/2012 |
| EP | 2472475 | 7/2012 |
| EP | 2562688 | 2/2013 |
| EP | 2662831 | 11/2013 |
| EP | 2693362 | 2/2014 |
| EP | 3400113 | 11/2018 |
| FR | 3001567 | 8/2014 |
| GB | 2323238 | 9/1998 |
| GB | 2330265 | 4/1999 |
| JP | 2014170431 | 9/2014 |
| JP | 2016194834 | 11/2016 |
| JP | 2017016539 | 1/2017 |
| KR | 101234798 | 1/2009 |
| KR | 1020190031431 | 3/2019 |
| WO | WO 99/23600 | 5/1999 |
| WO | WO 2003002935 | 1/2003 |
| WO | WO 2003025805 | 3/2003 |
| WO | WO 2006136958 | 12/2006 |
| WO | WO 2007042251 | 4/2007 |
| WO | WO 2008057504 | 5/2008 |
| WO | WO 2008154611 | 12/2008 |
| WO | WO 2012103199 | 8/2012 |
| WO | WO 2012103202 | 8/2012 |
| WO | WO 2012154801 | 11/2012 |
| WO | WO 2013165674 | 11/2013 |
| WO | WO 2014066422 | 5/2014 |
| WO | WO 2014092552 | 6/2014 |
| WO | WO 2014181323 | 11/2014 |
| WO | WO 2015127503 | 9/2015 |
| WO | WO 2016020038 | 2/2016 |
| WO | WO 2017175312 | 10/2017 |
| WO | WO 2017187106 | 11/2017 |
| WO | WO 2018018007 | 1/2018 |
| WO | WO 2018026631 | 2/2018 |
| WO | WO 2018204308 | 11/2018 |
| WO | WO 2018204342 | 11/2018 |
| WO | WO 2019023249 | 1/2019 |

OTHER PUBLICATIONS

"Plane Detection in Point Cloud Data" dated Jan. 25, 2010 by Michael Ying Yang and Wolfgang Forstner, Technical Report 1, 2010, University of Bonn.

"Swift Dimension" Trademark Omniplanar, Copyright 2014.

Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.

Batalin et al., "Mobile robot navigation using a sensor network," IEEE, International Conference on robotics and automation, Apr. 26, May 1, 2004, pp. 636-641.

Bazazian et al., "Fast and Robust Edge Extraction in Unorganized Point clouds," IEEE, 2015 International Conference on Digital Image Computing: Techniques and Applicatoins (DICTA), Nov. 23-25, 2015, pp. 1-8.

Boden, "French retail chain to roll out NFC shelf edge labels to six hypermarkets" (Sep. 19, 2018), pp. 1-7.

Biswas et al. "Depth Camera Based Indoor Mobile Robot Localization and Navigation" Robotics and Automation (ICRA), 2012 IEEE International Conference on IEEE, 2012.

Bohm, Multi-Image Fusion for Occlusion-Free Façade Texturing, International Archives of the Photogrammetry, Remote Sensing and Spatial Information Sciences, pp. 867-872 (Jan. 2004).

Bristow et al., "A Survey of Iterative Learning Control", IEEE Control Systems, Jun. 2006, pp. 96-114.

Buenaposada et al. "Realtime tracking and estimation of plane pose" Proceedings of the ICPR (Aug. 2002) vol. II, IEEE pp. 697-700.

Mitra et al., "Estimating surface normals in noisy point cloud data," International Journal of Computational geometry & applications, Jun. 8-10, 2003, pp. 322-328.

N.D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.

Ni et al., "Edge Detection and Feature Line Tracing in 3D-Point Clouds by Analyzing Geometric Properties of Neighborhoods," Remote Sensing, V8 I9, pp. 1-20 (2016).

Norriof et al., "Experimental comparison of some classical iterative learning control algorithms", IEEE Transactions on Robotics and Automation, Jun. 2002, pp. 636-641.

(56) References Cited

OTHER PUBLICATIONS

Notice of allowance for U.S. Appl. No. 13/568,175 dated Sep. 23, 2014.
Notice of allowance for U.S. Appl. No. 13/693,503 dated Mar. 11, 2016.
Notice of allowance for U.S. Appl. No. 14/068,495 dated Apr. 25, 2016.
Notice of allowance for U.S. Appl. No. 14/518,091 dated Apr. 12, 2017.
Notice of allowance for U.S. Appl. No. 15/211,103 dated Apr. 5, 2017.
Olson, Clark F., etal. "Wide-Baseline Stereo Vision for terrain Mapping" in Machine Vision and Applications, Aug. 2010.
Oriolo et al., "An iterative learning controller for nonholonomic mobile Robots", the international Journal of Robotics Research, Aug. 1997, pp. 954-970.
Ostafew et al., "Visual Teach and Repeat, Repeat, Repeat: Iterative learning control to improve mobile robot path tracking in challenging outdoor environment", IEEE/RSJ International Conference on Intelligent robots and Systems, Nov. 2013, pp. 176-181.
Park et al., "Autonomous mobile robot navigation using passive rfid in indoor environment," IEEE, Transactions on industrial electronics, vol. 56, issue 7, pp. 2366- 2373 (Jul. 2009).
Perveen et al. (An overview of template matching methodologies and its application, International Journal of Research in Computer and Communication Technology, v2n10, Oct. 2013) (Year: 2013).
Pivtoraiko et al., "Differentially constrained mobile robot motion planning in state lattices", journal of field robotics, vol. 26, No. 3, 2009, pgs. 308-333.
Pratt W K Ed: "Digital Image processing, 10-image enhancement, 17-image segmentation", Jan. 1, 2001, Digital Image Processing: PIKS Inside, New York: John Wily & Sons, US, pp. 243-258, 551.
Puwein, J., et al."Robust Multi-view camera calibration for wide-baseline camera networks,"in IEEE Workshop on Applications of computer vision (WACV), Jan. 2011.
Rusu, et al. "How to incrementally register pairs of clouds," PCL Library, retrieved from internet on Aug. 22, 2016 [http://pointclouds.org/documentation/tutorials/pairwise_incremental_registration.php.
Rusu, et al. "Spatial Change detection on unorganized point cloud data," PCL Library, retrieved from internet on Aug. 19, 2016 [http://pointclouds.org/documentation/tutorials/octree_change.php].
Rusu, et al. "Towards 3D Point cloud based object maps for household environments," Science Direct, vol. 56, issue 11, pp. 927-947 [http://www.sciencedirect.com/science/article/pii/S0921889008001140]. Nov. 30, 2008. Retrieved from the internet on Jun. 15, 2022.
Schnabel et al. "Efficient RANSAC for Point-Cloud Shape Detection", vol. 0, No. 0, pp. 1-12 (1981).
Senthilkumaran, et al., "Edge Detection Techniques for Image Segmentation—A Survey of Soft Computing Approaches", International Journal of Recent Trends in Engineering, vol. 1, No. 2 (May 2009).
Szeliski, "Modified Hough Transform", Computer Vision. Copyright 2011, pp. 251-254. Retrieved on Aug. 17, 2017 [http://szeliski.org/book/drafts/SzeliskiBook_20100903_draft.pdf].
Tahir, Rabbani, et al., "Segmentation of point clouds using smoothness constraint,"International Archives of Photogrammetry, Remote Sensing and Spatial Information Sciences 36.5 (Sep. 2006): 248-253.
Trevor et al., "Tables, Counters, and Shelves: Semantic Mapping of Surfaces in 3D," Retrieved from Internet Jul. 3, 2018 @ http://citeseerx.ist.psu.edu/viewdoc/download?doi=10.1.1.703.5365&rep=rep1&type=p.
Tseng, et al., "A Cloud Removal Approach for Aerial Image Visualization", International Journal of Innovative Computing, Information & Control, vol. 9, No. 6, pp. 2421-2440 (Jun. 2013).
Uchiyama, et al., "Removal of Moving Objects from a Street-View Image by Fusing Multiple Image Sequences", Pattern Recognition, 2010, 20th International Conference on, IEEE, Piscataway, NJ pp. 3456-3459 (Aug. 23, 2010).
United Kingdom Intellectual Property Office, "Combined Search and Examination Report" for GB Patent Application No. 1813580.6 dated Feb. 21, 2019.
United Kingdom Intellectual Property Office, Combined Search and Examination Report dated Jan. 22, 2016 for GB Patent Application No. 1417218.3.
United Kingdom Intellectual Property Office, Combined Search and Examination Report dated Jan. 22, 2016 for GB Patent Application No. 1521272.3.
United Kingdom Intellectual Property Office, Combined Search and Examination Report dated Mar. 11, 2015 for GB Patent Application No. 1417218.3.
United Kingdom Intellectual Property Office, Combined Search and Examination Report dated May 13, 2020 for GB Patent Application No. 19178649.
Varol Gul et al: "Product placement detection based on image processing", 2014 22nd Signal Processing and Communication Applications Conference (SIU), IEEE, Apr. 23, 2014.
Varol Gul et al: "Toward Retail product recognition on Grocery shelves", Visual Communications and image processing; Jan. 20, 2004; San Jose, (Mar. 4, 2015).
Weber et al., "Methods for Feature Detection in Point clouds," visualization of large and unstructured data sets—IRTG Workshop, pp. 90-99 (2010).
Zhao Zhou et al.: "An Image contrast Enhancement Algorithm Using PLIP-based histogram Modification", 2017 3rd IEEE International Conference on Cybernetics (CYBCON), IEEE, (Jun. 21, 2017).
Ziang Xie et al., "Multimodal Blending for High-Accuracy Instance Recognition", 2013 IEEE RSJ International Conference on Intelligent Robots and Systems, p. 2214-2221.
Fan Zhang et al., "Parallax-tolerant Image Stitching", 2014 Computer Vision Foundation, pp. 4321-4328.
Kaimo Lin et al., "Seagull: Seam-guided Local Alignment for Parallax-tolerant Image Stitching", Retrieved on Nov. 16, 2020 [http://publish.illinois.edu/visual-modeling-and-analytics/files/2016/08/Seagull.pdf].
Julio Zaragoza et al., "As-Projective-As-Possible Image Stitching with Moving DLT", 2013 Computer Vision Foundation, pp. 2339-2346.
Zeng et al., Multi-view Self Supervised Deep Learning for 6D Pose Estimation in the Amazon Picking Challenge, May 7, 2017. Retrieved on Nov. 16, 2019 [https://arxiv.org/pdf/1609.09475.pdf].
Zhang et al., "Mobile computing and industrial augmented reality for real-time data access", Emerging Technologies and Factory Automation, 2001, 8th IEEE International Conference on Oct. 15-18, 2001, pp. 583-588, vol. 2.
Carreira et al., "Enhanced Pca-based localization using depth maps with missing data," IEEE, pp. 1-8, Apr. 24, 2013.
Castorena et al., "Autocalibration of lidar and optical cameras via edge alignment", 2016 IEEE International Conference on Acoustics, Speech and Signal Processing (Mar. 20, 2016).
Chen et al. "Improving Octree-Based Occupancy Maps Using Environment Sparsity with Application to Aerial Robot Navigation" Robotics and Automation (ICRA), 2017 IEEE International Conference on IEEE, pp. 3656-3663, 2017.
Clark, "Casino to open world's first NFC-enabled supermarket", (Sep. 19, 2018), pp. 1-7.
Clark, "Jogtek launches passive NFC shelf-edge labels", (Sep. 19, 2018), pp. 1-6.
Cleveland Jonas et al: "Automated System for Semantic Object Labeling with Soft-Object Recognition and Dynamic Programming Segmentation", IEEE Transactions on Automation Science and Engineering, IEEE Service Center, New York, NY (Apr. 1, 2017).
Cook et al., "Distributed Ray Tracing ACM SIGGRAPH Computer Graphics", vol. 18, No. 3, ACM pp. 137-145, 1984.
Datta, A., et al. "Accurate camera calibration using iterative refinement of control points," in Computer Vision Workshops (ICCV Workshops), 2009.

(56) References Cited

OTHER PUBLICATIONS

Deschaud, et al., "A Fast and Accurate Place Detection algoritm for large noisy point clouds using filtered normals and voxel growing," 3DPVT, May 2010, Paris, France. [hal-01097361].

Douillard, Bertrand, et al. "On the segmentation of 3D LIDAR point clouds." Robotics and Automation (ICRA), 2011 IEEE International Conference on IEEE, 2011.

Dubois, M., et al., A comparison of geometric and energy-based point cloud semantic segmentation methods, European Conference on Mobile Robots (ECMR), p. 88-93, 25-27, Sep. 2013.

Duda, et al., "Use of the Hough Transformation to Detect Lines and Curves in Pictures", Stanford Research Institute, Menlo Park, California, Graphics and Image Processing, Communications of the ACM, vol. 15, No. 1 (Jan. 1972).

F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176-p. 178.

Federico Tombari et al. "Multimodal cue integration through Hypotheses Verification for RGB-D object recognition and 6DOF pose estimation", IEEE International Conference on Robotics and Automation, Jan. 2013.

Flores, et al., "Removing Pedestrians from Google Street View Images", Computer Vision and Pattern Recognition Workshops, 2010 IEEE Computer Society Conference on, IEE, Piscataway, NJ, pp. 53-58 (Jun. 13, 2010).

Glassner, "Space Subdivision for Fast Ray Tracing." IEEE Computer Graphics and Applications, 4.10, pp. 15-24, 1984.

Golovinskiy, Aleksey, et al. "Min-Cut based segmentation of point clouds." Computer Vision Workshops (ICCV Workshops), 2009 IEEE 12th International Conference on. IEEE, 2009.

Hackel et al., "Contour Detection in unstructured 3D point clouds,"IEEE, 2016 Conference on Computer vision and Pattern recognition (CVPR), Jun. 27-30, 2016, pp. 1-9.

Hao et al., "Structure-based object detection from scene point clouds," Science Direct, v191, pp. 148-160 (2016).

Hu et al., "An improved method of discrete point cloud filtering based on complex environment," International Journal of Applied Mathematics and Statistics, v48, i18 (2013).

International Search Report and Written Opinion for International Patent Application No. PCT/US2013/070996 dated Apr. 2, 2014.

International Search Report and Written Opinion for International Patent Application No. PCT/US2013/053212 dated Dec. 1, 2014.

International Search Report and Written Opinion for corresponding International Patent Application No. PCT/US2016/064110 dated Mar. 20, 2017.

International Search Report and Written Opinion for corresponding International Patent Application No. PCT/US2017/024847 dated Jul. 7, 2017.

International Search Report and Written Opinion for International Application No. PCT/CN2017/083143 dated Feb. 11, 2018.

International Search Report and Written Opinion for International Application No. PCT/US2018/030419 dated Aug. 31, 2018.

International Search Report and Written Opinion from International Patent Application No. PCT/US2018/030345 dated Sep. 17, 2018.

International Search Report and Written Opinion from International Patent Application No. PCT/US2018/030360 dated Jul. 9, 2018.

International Search Report and Written Opinion from International Patent Application No. PCT/US2018/030363 dated Jul. 9, 2018.

International Search Report and Written Opinion for International Application No. PCT/U52019/025859 dated Jul. 3, 2019.

International Search Report and Written Opinion from International Patent Application No. PCT/US2019/025849 dated Jul. 9, 2019.

International Search Report and Written Opinion from International Patent Application No. PCT/US2019/049761 dated Nov. 15, 2019.

International Search Report and Written Opinion from International Patent Application No. PCT/US2019/051312 dated Nov. 15, 2019.

International Search Report and Written Opinion from International Patent Application No. PCT/US2019/054103 dated Jan. 6, 2020.

International Search Report and Written Opinion for International Patent Application No. PCT/US2019/057007 dated Jan. 14, 2020.

International Search Report and Written Opinion from International Patent Application No. PCT/US2019/064020 dated Feb. 19, 2020.

International Search Report and Written Opinion for International Patent Application No. PCT/US2020/027948 dated Jul. 16, 2020.

International Search Report and Written Opinion for International Patent Application No. PCT/US2020/028133 dated Jul. 24, 2020.

International Search Report and Written Opinion from International Patent Application No. PCT/US2020/029134 dated Jul. 27, 2020.

International Search Report and Written Opinion from International Patent Application No. PCT/US2020/028183 dated Jul. 24, 2020.

International Search Report and Written Opinion from International Patent Application No. PCT/US2020/035285 dated Aug. 27, 2020.

International Search Report and Written Opinion for International Patent Application No. PCT/US2021/024805 dated Aug. 2, 2021.

International Search Report and Written Opinion for International Patent Application No. PCT/US2021/057388 dated Feb. 2, 2022.

International Search Report and Written Opinion for International Patent Application No. PCT/IB2021/060948 dated Feb. 4, 2022.

International Search Report and Written Opinion for International Patent Application No. PCT/US2022/037723 dated Jul. 20, 2022.

Jadhav et al. "Survey on Spatial Domain dynamic template matching technique for scanning linear barcode," International Journal of science and research v 5 n 3, Mar. 2016)(Year: 2016).

Jian Fan et al: "Shelf detection via vanishing point and radial projection", 2014 IEEE International Conference on image processing (ICIP), IEEE, (Oct. 27, 2014), pp. 1575-1578.

Kaikai Liu et al., "Enabling Context-Aware Indoor Augmented Reality via Smartphone Sensing and Vision Tracking", ACM Transactions on Multimedia Computing Communications and Applications, Association for Computer Machinery, US, vol. 12, No. 1s.

Kang et al., "Kinematic Path-Tracking of Mobile Robot Using Iterative learning Control", Journal of Robotic Systems, 2005, pp. 111-121.

Kay et al. "Ray Tracing Complex Scenes." ACM SIGGRAPH Computer Graphics, vol. 20, No. 4, ACM, pp. 269-278, 1986.

Kelly et al., "Reactive Nonholonomic Trajectory Generation via Parametric Optimal Control", International Journal of Robotics Research, vol. 22, No. 7-8, pp. 583-601 (Jul. 30, 2013).

Lari, Z., et al., "An adaptive approach for segmentation of 3D laser point cloud." International Archives of the Photogrammertry, Remote sensing and spatial information Sciences, vol. XXXVIII-5/W12, 2011, ISPRS Calgary 2011 Workshop, Aug. 29-31, 2011, Calgary, Canada.

Lecking et al: "Localization in a wide range of industrial environments using relative 3D ceiling features", IEEE, pp. 333-337 (Sep. 15, 2008).

Lee et al. "Statistically Optimized Sampling for Distributed Ray Tracing." ACM SIGGRAPH Computer Graphics, vol. 19, No. 3, ACM, pp. 61-67, 1985.

Li et al., "An improved RANSAC for 3D Point cloud plane segmentation based on normal distribution transformation cells," Remote sensing, V9: 433, pp. 1-16 (2017).

Likhachev, Maxim, and Dave Ferguson. "Planning Long dynamically feasible maneuvers for autonomous vehicles." The international journal of Robotics Reasearch 28.8 (2009): 933-945. (Year:2009).

Marder-Eppstein et al., "The Office Marathon: robust navigation in an indoor office environment," IEEE, 2010 International conference on robotics and automation, May 3-7, 2010, pp. 300-307.

McNaughton, Matthew, et al. "Motion planning for autonomous driving with a conformal spatiotemporal lattice." Robotics and Automation (ICRA), 2011 IEEE International Conference on. IEEE, 2011. (Year: 2011).

Meyersohn, "Walmart turns to robots and apps in stores", https://www.cnn.com/2018/12/07/business/walmart-robot-janitors-dotcom-store/index.html, Oct. 29, 2019.

\* cited by examiner

METHOD, SYSTEM AND APPARATUS FOR DATA CAPTURE ILLUMINATION CONTROL

BACKGROUND

Environments in which objects are managed, such as retail facilities, warehousing and distribution facilities, and the like, may store such objects in regions such as aisles of shelf modules or the like. For example, a retail facility may include objects such as products for purchase, and a distribution facility may include objects such as parcels or pallets.

A mobile automation apparatus may be deployed within such facilities to perform tasks at various locations. For example, a mobile automation apparatus may be deployed to capture data representing an aisle in a retail facility for use in identifying products that are out of stock, incorrectly located, and the like. The dynamic nature of environments such as the retail facility may complicate data capture. For example, illumination employed by the apparatus to aid in data capture may interfere with customers, staff or the like within the facility.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
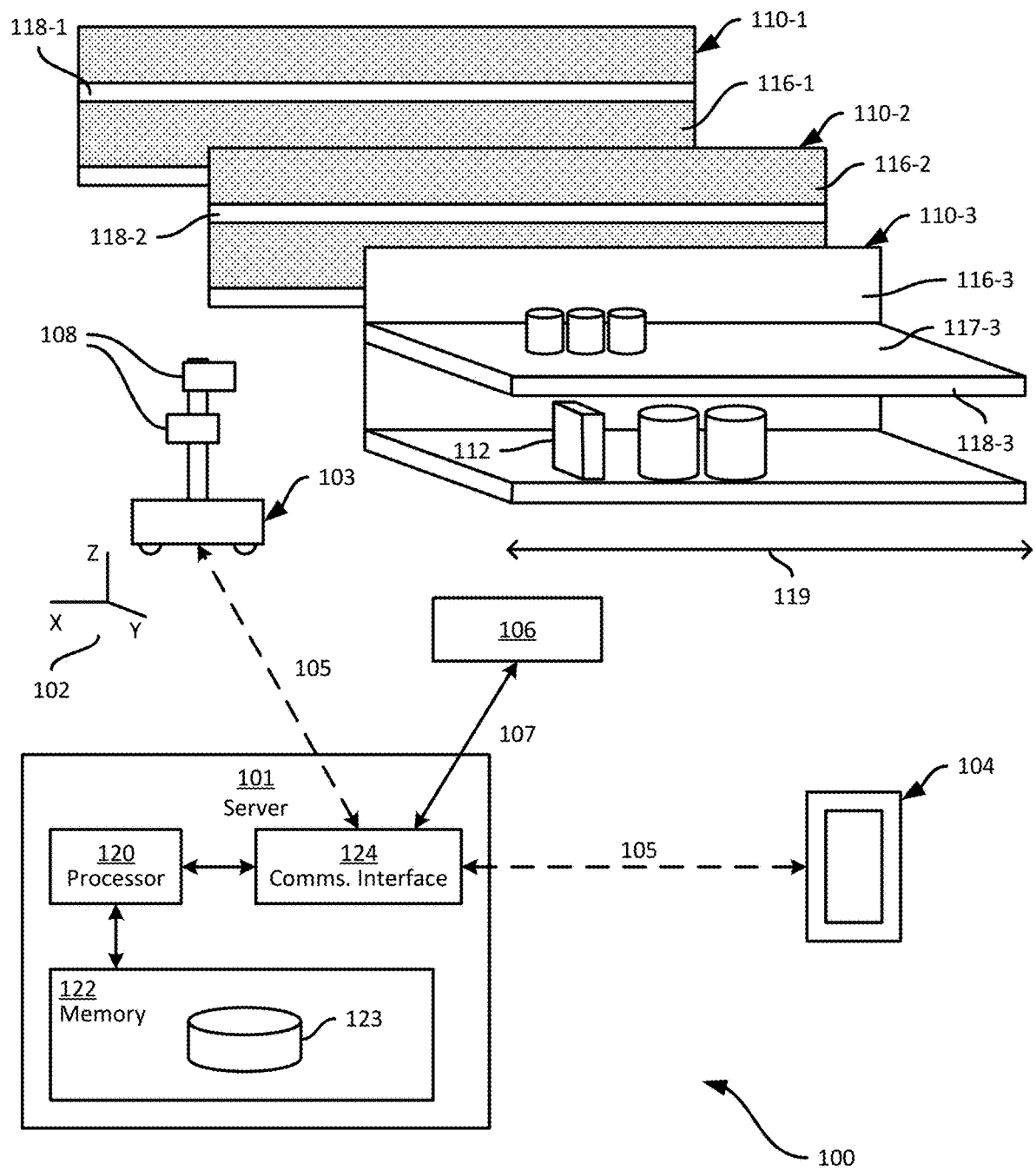
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method in a navigational controller, the method comprising: obtaining image data and depth data from sensors of a mobile automation apparatus; detecting an obstacle from the depth data, for classification as a human or non-human obstacle; in response to classification of the obstacle as a human obstacle, selecting a portion of the image data that corresponds to the obstacle; detecting, from the selected image data, a feature of the obstacle; based on a detected position of the detected feature, selecting an illumination control action; and controlling an illumination subsystem of the mobile automation apparatus according to the selected illumination control action.

Additional examples disclosed herein are directed to a mobile automation apparatus, comprising: an image sensor; a depth sensor; a chassis supporting an illumination subsystem configured to emit light; a navigational controller connected to the image sensor, the depth sensor, and the illumination subsystem, the navigational controller configured to: obtain image data and depth data from the image sensor and the depth sensor; detect an obstacle from the depth data, for classification as a human or non-human obstacle; in response to classification of the obstacle as a human obstacle, select a portion of the image data that corresponds to the obstacle; detect, from the selected image data, a feature of the obstacle; based on a detected position of the detected feature, select an illumination control action; and control the illumination subsystem according to the selected illumination control action.

FIG. 1 depicts a mobile automation system 100 in accordance with the teachings of this disclosure. The system 100 includes a server 101 in communication with at least one mobile automation apparatus 103 (also referred to herein simply as the apparatus 103) and at least one client computing device 104 via communication links 105, illustrated in the present example as including wireless links. In the present example, the links 105 are provided by a wireless local area network (WLAN) deployed via one or more access points (not shown). In other examples, the server 101, the client device 104, or both, are located remotely (i.e. outside the environment in which the apparatus 103 is deployed), and the links 105 therefore include wide-area networks such as the Internet, mobile networks, and the like. The system 100 also includes a dock 106 for the apparatus 103 in the present example. The dock 106 is in communication with the server 101 via a link 107 that in the present example is a wired link. In other examples, however, the link 107 is a wireless link.

The client computing device 104 is illustrated in FIG. 1 as a mobile computing device, such as a tablet, smart phone or the like. In other examples, the client device 104 is implemented as another type of computing device, such as a desktop computer, a laptop computer, another server, a kiosk, a monitor, and the like. The system 100 can include a plurality of client devices 104 in communication with the server 101 via respective links 105.

The system 100 is deployed, in the illustrated example, in a retail facility including a plurality of support structures such as shelf modules 110-1, 110-2, 110-3 and so on (collectively referred to as shelf modules 110 or shelves 110, and generically referred to as a shelf module 110 or shelf 110—this nomenclature is also employed for other elements discussed herein). Each shelf module 110 supports a plurality of products 112. Each shelf module 110 includes a shelf back 116-1, 116-2, 116-3 and a support surface (e.g. support surface 117-3 as illustrated in FIG. 1) extending from the shelf back 116 to a shelf edge 118-1, 118-2, 118-3.

The shelf modules 110 (also referred to as sub-regions of the facility) are typically arranged in a plurality of aisles (also referred to as regions of the facility), each of which includes a plurality of modules 110 aligned end-to-end. In such arrangements, the shelf edges 118 face into the aisles, through which customers in the retail facility, as well as the apparatus 103, may travel. As will be apparent from FIG. 1, the term "shelf edge" 118 as employed herein, which may also be referred to as the edge of a support surface (e.g., the support surfaces 117) refers to a surface bounded by adjacent surfaces having different angles of inclination. In the example illustrated in FIG. 1, the shelf edge 118-3 is at an angle of about ninety degrees relative to the support surface 117-3 and to the underside (not shown) of the support surface 117-3. In other examples, the angles between the shelf edge 118-3 and the adjacent surfaces, such as the support surface 117-3, is more or less than ninety degrees.

The apparatus 103 is equipped with a plurality of navigation and data capture sensors 108, such as image sensors (e.g. one or more digital cameras) and depth sensors (e.g. one or more Light Detection and Ranging (LIDAR) sensors, one or more depth cameras employing structured light patterns, such as infrared light, or the like). The apparatus 103 is deployed within the retail facility and, via communication with the server 101 and use of the sensors 108, navigates autonomously or partially autonomously along a length 119 of at least a portion of the shelves 110.

While navigating among the shelves 110, the apparatus 103 can capture images, depth measurements and the like, representing the shelves 110 (generally referred to as shelf data or captured data). Navigation may be performed according to a frame of reference 102 established within the retail facility. The apparatus 103 therefore tracks its pose (i.e. location and orientation) in the frame of reference 102. The apparatus 103 can navigate the facility by generating paths from origin locations to destination locations. For example, to traverse an aisle while capturing data representing the shelves 110 of that aisle, the apparatus 103 can generate a path that traverses the aisle.

The apparatus 103 can be configured to detect obstacles during traversal of an aisle, such as customers and/or workers in the retail facility, objects on a floor of the facility, and the like. The apparatus 103 may, with or without assistance from the server 101, modify the above-mentioned path in response to detecting such obstacles, e.g. to avoid collisions.

During travel along a path (e.g. to traverse an aisle in the retail facility) the apparatus 103 may control an illumination subsystem, discussed below in greater detail, to illuminate the shelves 110 for data capture. As will be discussed in greater detail below, the apparatus 103 may control the illumination subsystem based in part on the above-mentioned obstacle detections, to avoid interfering with the activities of customers, workers and the like in the facility.

The server 101 includes a special purpose controller, such as a processor 120, specifically designed to control and/or assist the mobile automation apparatus 103 to navigate the environment and to capture data. The processor 120 is interconnected with a non-transitory computer readable storage medium, such as a memory 122, having stored thereon computer readable instructions for performing various functionality, including control of the apparatus 103 to navigate the modules 110 and capture shelf data, as well as post-processing of the shelf data. The memory 122 can also store data for use in the above-mentioned control of the apparatus 103, such as a repository 123 containing a map of the retail environment and any other suitable data (e.g. operational constraints for use in controlling the apparatus 103, data captured by the apparatus 103, and the like).

The memory 122 includes a combination of volatile memory (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. In some embodiments, the processor 120 is implemented as one or more central processing units (CPUs) and/or graphics processing units (GPUs).

The server 101 also includes a communications interface 124 interconnected with the processor 120. The communications interface 124 includes suitable hardware (e.g. transmitters, receivers, network interface controllers and the like) allowing the server 101 to communicate with other computing devices—particularly the apparatus 103, the client device 104 and the dock 106—via the links 105 and 107. The links 105 and 107 may be direct links, or links that traverse one or more networks, including both local and wide-area networks. The specific components of the communications interface 124 are selected based on the type of network or other links that the server 101 is required to communicate over. In the present example, as noted earlier, a wireless local-area network is implemented within the retail facility via the deployment of one or more wireless access points. The links 105 therefore include either or both wireless links between the apparatus 103 and the mobile device 104 and the above-mentioned access points, and a wired link (e.g. an Ethernet-based link) between the server 101 and the access point.

The processor 120 can therefore obtain data captured by the apparatus 103 via the communications interface 124 for storage (e.g. in the repository 123) and subsequent processing (e.g. to detect objects such as shelved products in the captured data, and detect status information corresponding to the objects). The server 101 may also transmit status notifications (e.g. notifications indicating that products are out-of-stock, in low stock or misplaced) to the client device 104 responsive to the determination of product status data. The client device 104 includes one or more controllers (e.g. central processing units (CPUs) and/or field-programmable gate arrays (FPGAs) and the like) configured to process (e.g. to display) notifications received from the server 101.

Figure 2:
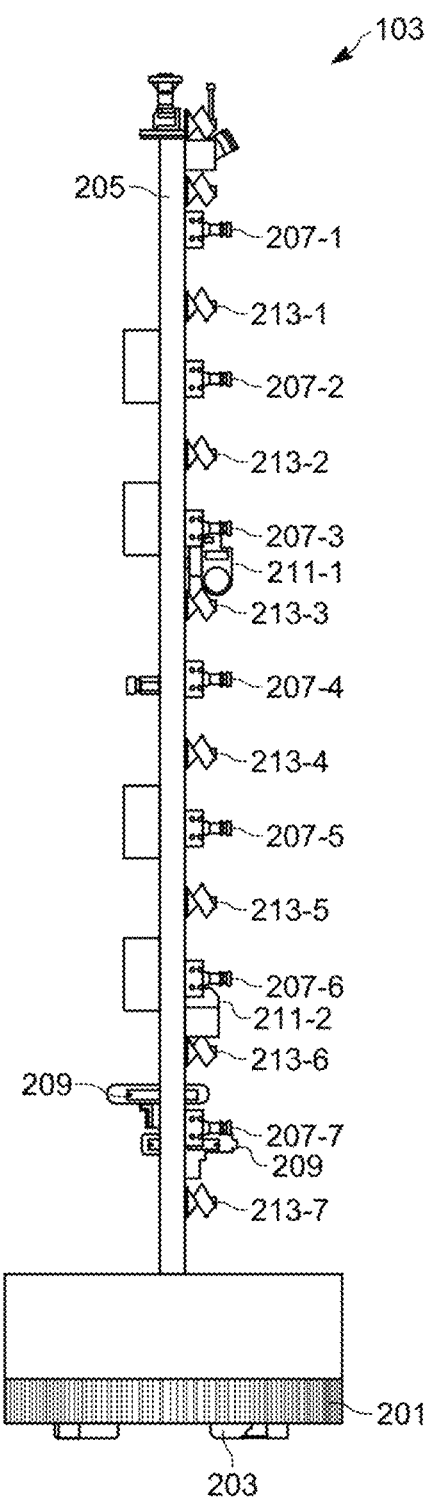
FIG. 2 is a side view of a mobile automation apparatus in the system of FIG. 1.

Turning now to FIG. 2, the mobile automation apparatus 103 is shown in greater detail. The apparatus 103 includes a chassis 201 containing a locomotive assembly 203 (e.g. one or more electrical motors driving wheels, tracks or the like). The apparatus 103 further includes a sensor mast 205 supported on the chassis 201 and, in the present example, extending upwards (e.g., substantially vertically) from the chassis 201. The mast 205 supports the sensors 108 mentioned earlier. In particular, the sensors 108 include at least one imaging sensor 207, such as a digital camera. In the present example, the mast 205 supports seven digital cameras 207-1 through 207-7 oriented to face the shelves 110.

The mast 205 also supports at least one depth sensor 209, such as a 3D digital camera capable of capturing both depth data and image data. The apparatus 103 also includes additional depth sensors, such as LIDAR sensors 211. In the present example, the mast 205 supports two LIDAR sensors 211-1 and 211-2. As shown in FIG. 2, the cameras 207 and the LIDAR sensors 211 are arranged on one side of the mast 205, while the depth sensor 209 is arranged on a front of the mast 205. That is, the depth sensor 209 is forward-facing (i.e. captures data in the direction of travel of the apparatus 103), while the cameras 207 and LIDAR sensors 211 are side-facing (i.e. capture data alongside the apparatus 103, in a direction perpendicular to the direction of travel). In other examples, the apparatus 103 includes additional sensors, such as one or more RFID readers, temperature sensors, and the like.

The mast 205 also supports a plurality of illumination assemblies 213, configured to illuminate the fields of view of the respective cameras 207. The illumination assemblies 213 may be referred to collectively as an illumination subsystem. That is, the illumination assembly 213-1 illuminates the field of view of the camera 207-1, and so on. The cameras 207 and lidars 211 are oriented on the mast 205 such that the fields of view of the sensors each face a shelf 110 along the length 119 of which the apparatus 103 is traveling. The apparatus 103 is configured to track a pose of the apparatus 103 (e.g. a location and orientation of the center of the chassis 201) in the frame of reference 102, permitting data captured by the apparatus 103 to be registered to the frame of reference 102 for subsequent processing.

Figure 3:
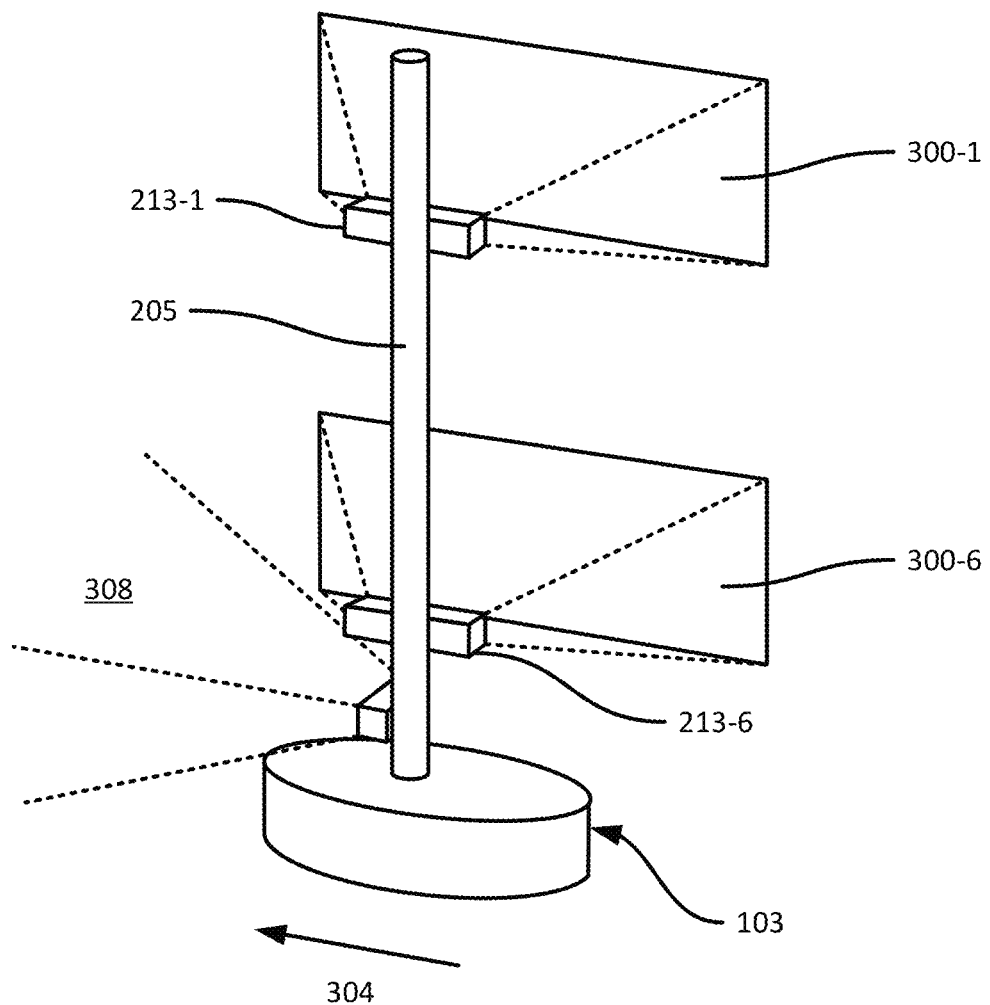
FIG. 3 is a diagram of the mobile automation apparatus of FIG. 2 illustrating fields of illumination of the apparatus.

FIG. 3 illustrates a simplified view of the apparatus 103, including the illumination assemblies 213-1 and 213-2 with respective fields of illumination 300-1 and 300-6. As shown in FIG. 3, the fields of illumination 300 are substantially perpendicular to a direction of travel 304 of the apparatus 103. Certain sensors, such as the depth camera 209, may have a field of view 308 that extends forward of the apparatus 103, in the direction of travel 304. In other examples, the field of view 308 can be angled at an intermediate angle between the fields of illumination 300 and the field of view 308 as illustrated in FIG. 3. Other sensors (e.g. the LIDAR sensors 211) may have fields of view that are perpendicular to the direction of travel 304. At least one of the cameras 207 may also have a field of view that is angled in the direction of travel 304, rather than being perpendicular to the direction of travel 304.

Figure 4:
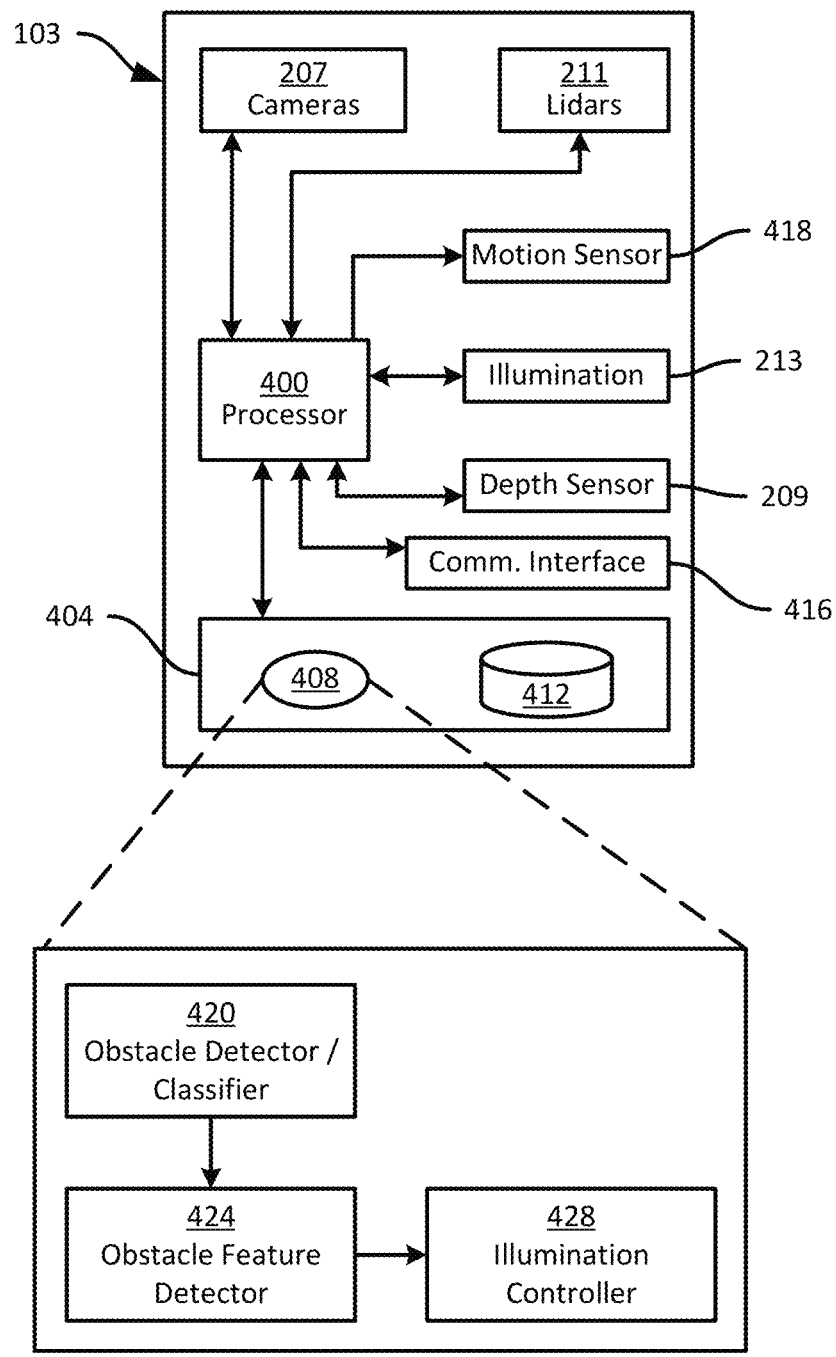
FIG. 4 is a block diagram of certain internal components of the mobile automation apparatus in the system of FIG. 1.

Referring to FIG. 4, certain components of the mobile automation apparatus 103 are shown, in addition to the cameras 207, depth sensor 209, lidars 211, and illumination assemblies 213 mentioned above. The apparatus 103 includes a special-purpose controller, such as a processor 400, interconnected with a non-transitory computer readable storage medium, such as a memory 404. The memory 404 includes a suitable combination of volatile memory (e.g. Random Access Memory or RAM) and non-volatile memory (e.g. read only memory or ROM, Electrically Erasable Programmable Read Only Memory or EEPROM, flash memory). The processor 400 and the memory 404 each comprise one or more integrated circuits. The memory 404 stores computer readable instructions for execution by the processor 400. In particular, the memory 404 stores an illumination control application 408 which, when executed by the processor 400, configures the processor 400 to perform various functions related to controlling the illumination assemblies 213 based on detection and classification of obstacles in the vicinity of the apparatus 103 during a data capture operation.

The processor 400, when so configured by the execution of the application 408, may also be referred to as a navigational controller 400. Those skilled in the art will appreciate that the functionality implemented by the processor 400 via the execution of the application 408 may also be implemented by one or more specially designed hardware and firmware components, such as FPGAs, ASICs and the like in other embodiments.

The memory 404 may also store a repository 412 containing, for example, a map of the environment in which the apparatus 103 operates, for use during the execution of the application 408. The apparatus 103 also includes a communications interface 416 enabling the apparatus 103 to communicate with the server 101 (e.g. via the link 105 or via the dock 106 and the link 107), for example to receive instructions to navigate to specified locations and initiate data capture operations.

In addition to the sensors mentioned earlier, the apparatus 103 can also include a motion sensor 418, such as one or more wheel odometers coupled to the locomotive assembly 203. The motion sensor 418 can also include, in addition to or instead of the above-mentioned wheel odometer(s), an inertial measurement unit (IMU) configured to measure acceleration along a plurality of axes.

FIG. 4 also illustrates certain example components of the application 408. In other examples, the illustrated components of the application 408 can be implemented as distinct applications.

The components of the application 408, in the illustrated example, include an obstacle detector and classifier 420, a feature detector 424, and an illumination controller 428. The detector and classifier 420 is configured to detect obstacles based on image and/or depth data, and to classify the obstacles as human or non-human obstacles. The detector and classifier 420 may also classify detected obstacles as static or dynamic (i.e. obstacles in motion). The obstacle feature detector 424 receives indications of human-classified obstacles from the detector and classifier 420, detects certain features (e.g. human faces) associated with the detected obstacles, and passes such detections to the illumination controller 428. The illumination controller 428 receives the above-mentioned feature detections (and may also receive obstacle positions and classifications from the detector 420), and selects illumination control actions accordingly.

Figure 5:
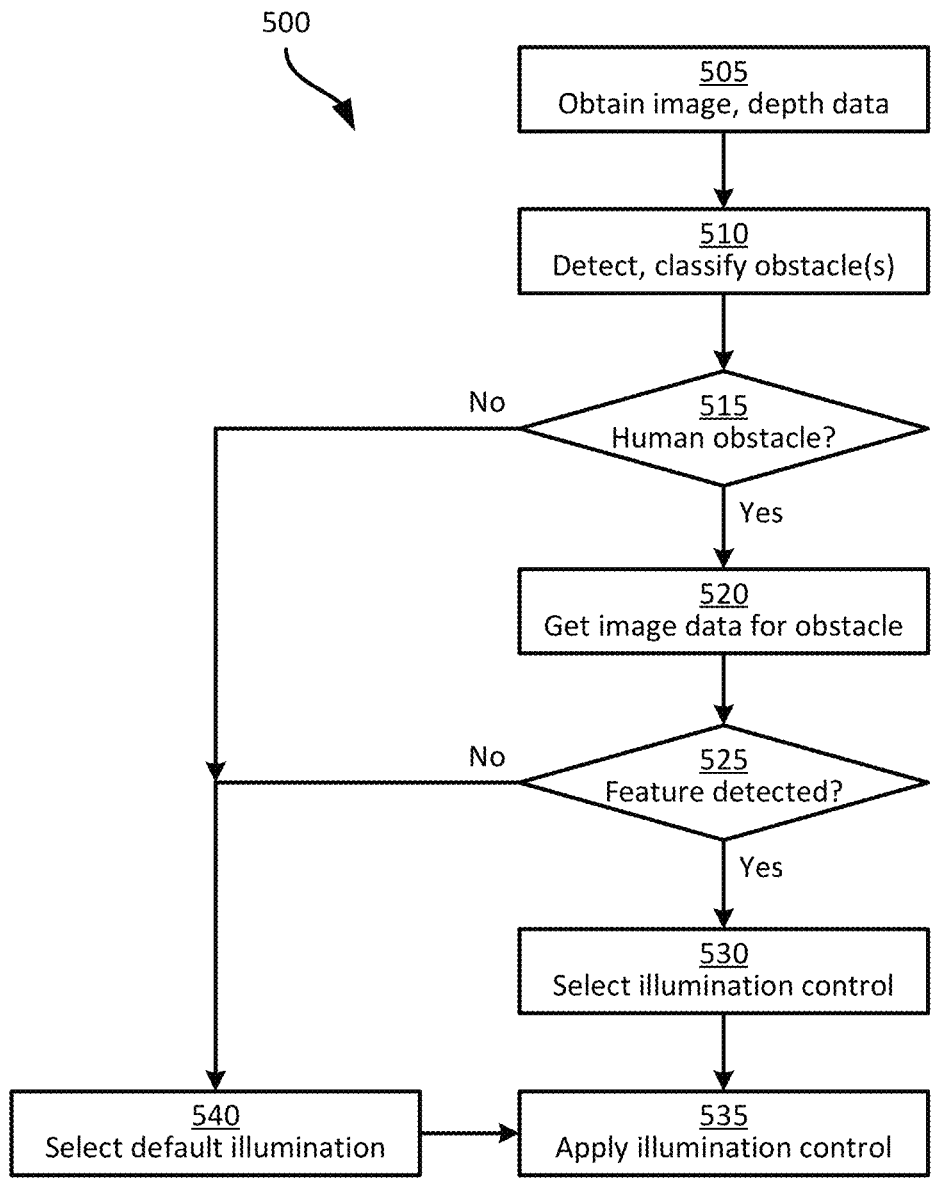
FIG. 5 is a flowchart of a method of illumination control in the system of FIG. 1.

The actions performed by the apparatus 103, and specifically by the processor 400 as configured via execution of the application 408, to control the illumination assemblies based on obstacle detections will now be discussed in greater detail with reference to FIG. 5. FIG. 5 illustrates a method 500 of illumination control during data capture tasks. The method 500 will be described in conjunction with its performance in the system 100, and in particular by the apparatus 103, with reference to the components illustrated in FIGS. 2, 3 and 4. As will be apparent in the discussion below, in other examples, some or all of the processing performed by the server 101 may be performed by the apparatus 103, and some or all of the processing performed by the apparatus 103 may be performed by the server 101.

Beginning at block 505, the processor 400 is configured to obtain image data and depth data via the sensors mentioned earlier (e.g. the depth camera 209, the cameras 207 and the LIDAR sensors 211). For example, the processor 400 can control the depth camera 209, the cameras 207 and the LIDARs 211 to capture image and depth data at each of a sequence of instances in time as the apparatus 103 travels along an aisle of shelves 110. Data capture at block 505 can be performed at various suitable frequencies, e.g. 30 Hz (although capture frequencies below and above 30 Hz are also contemplated).

Figure 6:
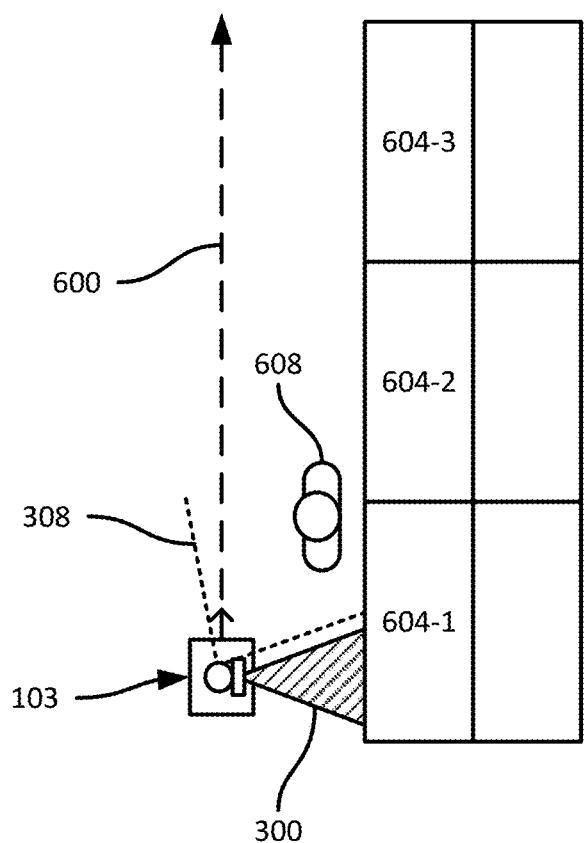
FIG. 6 is a diagram of a performance of block 505 of the method of FIG. 5.

Turning briefly to FIG. 6, an overhead view of the apparatus 103 is shown travelling along a path 600 to traverse an aisle formed by modules 604-1, 604-2 and 604-3, which may each have similar structural features to the modules 110 discussed in connection with FIG. 1. The field of view 308 of the depth camera 209 is also illustrated, as is the fields of illumination 300 of the illumination assemblies 213 (which coincide with each other when viewed from above). The fields of view of the cameras 207 may coincide with the fields of illumination 300. In some examples, the field of view of at least one camera 207 may be angled towards the direction of travel of the apparatus 103, e.g. in alignment with the field of view 308, or intermediate between the field of view 308 and the fields of illumination 300.

At a current performance of block 505, therefore, the apparatus 103 is configured to capture image and depth data depicting at least a portion of the module 604-1, as well as an obstacle 608.

Returning to FIG. 5, at block 510 the processor 400 (and particularly the obstacle detector and classifier 420) is configured to detect and classify obstacles in the data obtained at block 505. In general, an obstacle is an object detected in the data obtained at block 505 that does not appear in the map of the facility stored in the repository 412. The processor 400 can therefore be configured, at block 510, to detect objects in the captured data via any suitable object detection mechanism (e.g. detecting clusters in point cloud data, detecting edges in image data, and the like). The positions of such objects can be determined in the frame of reference 102 and compared to the above-mentioned map. Any detected objects that do not appear in the map can be stored as obstacles.

In the present example, the obstacle 608 is assumed to be an unmapped object, and is therefore detected as an obstacle at block 510. At block 510, the processor 400 is also configured to classify any detected obstacles. Obstacle classification, in the present example, includes determining whether the obstacle is a human obstacle. Various suitable human detection mechanisms can be implemented by the detector/classifier 420 at block 510. Examples of such mechanisms include support-vector machine (SVM) classification, decision tree classification, bag of words classification, and detection based on the use of local surface normals in the depth data. The detector/classifier 420 can generate an object boundary corresponding to each detected obstacle, as well as a classification associated with each detected obstacle indicating whether the obstacle is a human obstacle.

Figure 7:
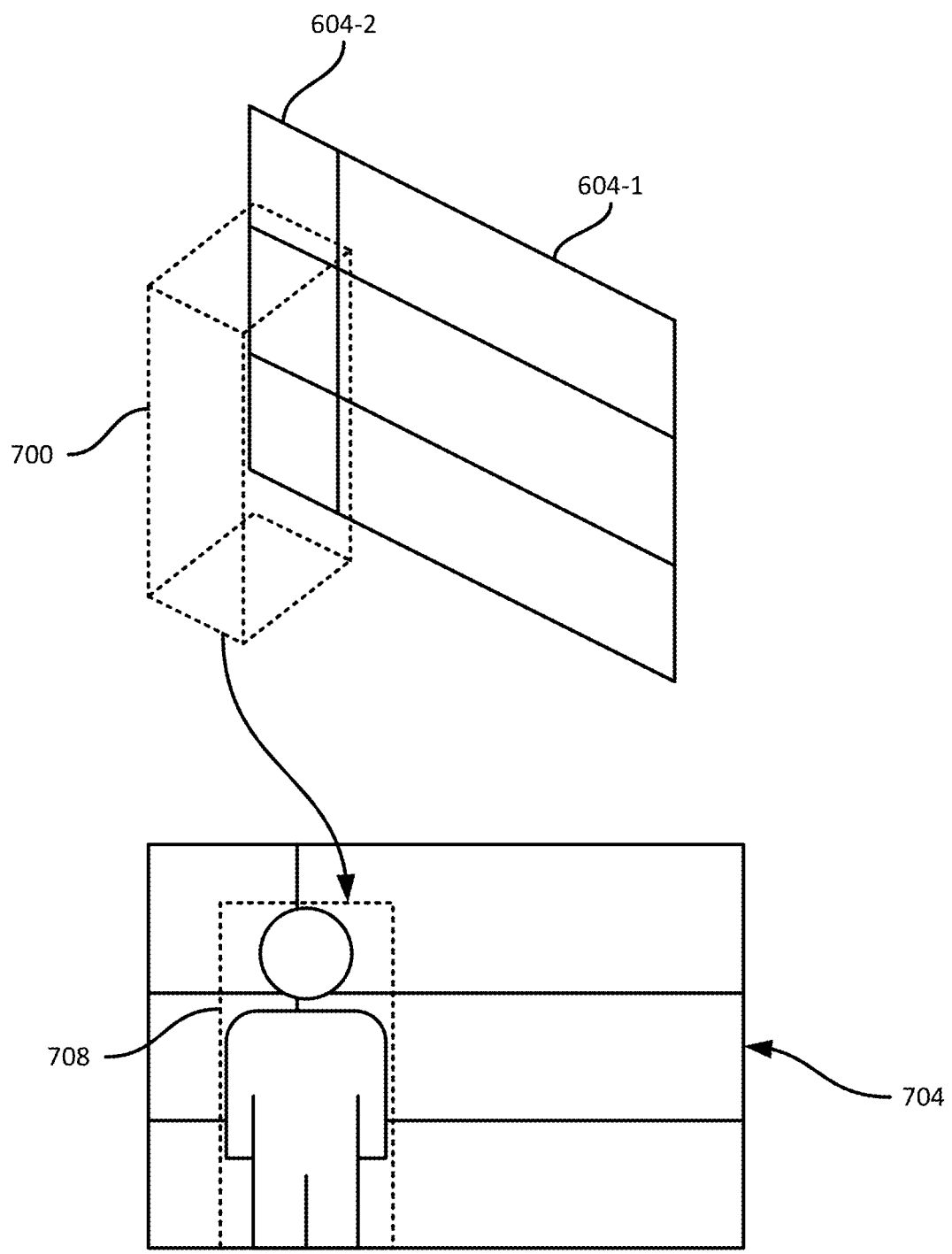
FIG. 7 is a diagram illustrating a performance of block 510 of the method of FIG. 5.

For example, referring to FIG. 7, a bounding box 700 is illustrated indicating a detected obstacle that has been classified as a human obstacle (i.e. the obstacle 608 shown in FIG. 6). Returning to FIG. 5, at block 515 the processor 400 is configured to determine, for each detected obstacle, whether the obstacle was classified as a human obstacle. When the determination at block 515 is affirmative, the processor 400 implements additional functionality as discussed below to control the illumination assemblies 213, in order to mitigate interference with the activities of customers, workers and the like within the facility.

At block 520, the processor 400, and particularly the feature detector 424, is configured to retrieve a portion of the image data that corresponds to the boundary (e.g. the bounding box 700) of the human-classified obstacle. Referring again to FIG. 7, image data 704 is illustrated, as captured at block 505. As will be apparent to those skilled in the art, the image data 704 may represent images captured by a plurality of sensors (e.g. at least one of the cameras 207 and/or the camera 209). The image data 704 is illustrated as a single combined image for simplicity, but may be processed as separate images in other implementations.

As noted earlier, captured image and depth data may be registered to the frame of reference 102, and the processor 400 can therefore determine, according to the frame of reference 102, which portion of the image data depicts the same region as is contained within the bounding box 700. Thus, in the present example performance of block 520, the processor 400 retrieves a portion 708 of the image data 704.

At block 525, the processor 400 (and particularly the feature detector 424) is configured to detect a predetermined feature of the obstacle. In the present example, the feature detected at block 525 is a human face. Human faces may be detected from image data according to any of a variety of suitable facial detection mechanisms. For example, the feature detector 424 can implement a convolutional neural network (CNN) accepting the portion 708 of the image data as input, and generating as output a feature boundary (e.g. a two-dimensional bounding box) and a confidence level. The confidence level indicates the probability that the feature (e.g. a face) is present in the boundary. Various forms of facial detection mechanisms may be employed, including a multi-scale cascade CNN, Regions with CNN features (R-CNN), You Only Look Once (YOLO) face detection, and the like.

Figure 8:
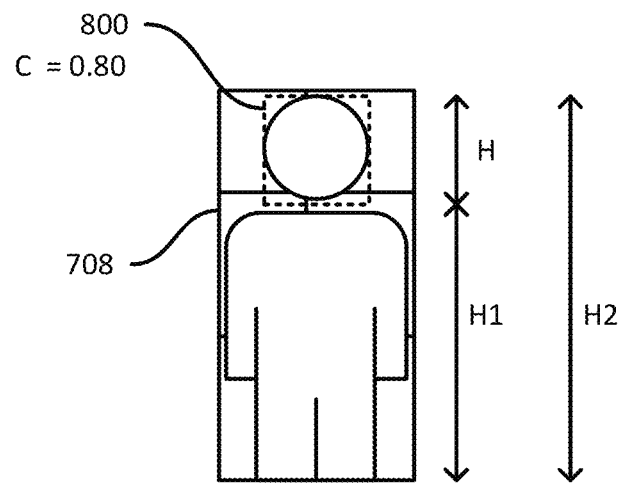
FIG. 8 is a diagram illustrating a performance of block 525 of the method of FIG. 5.
Figure 8:
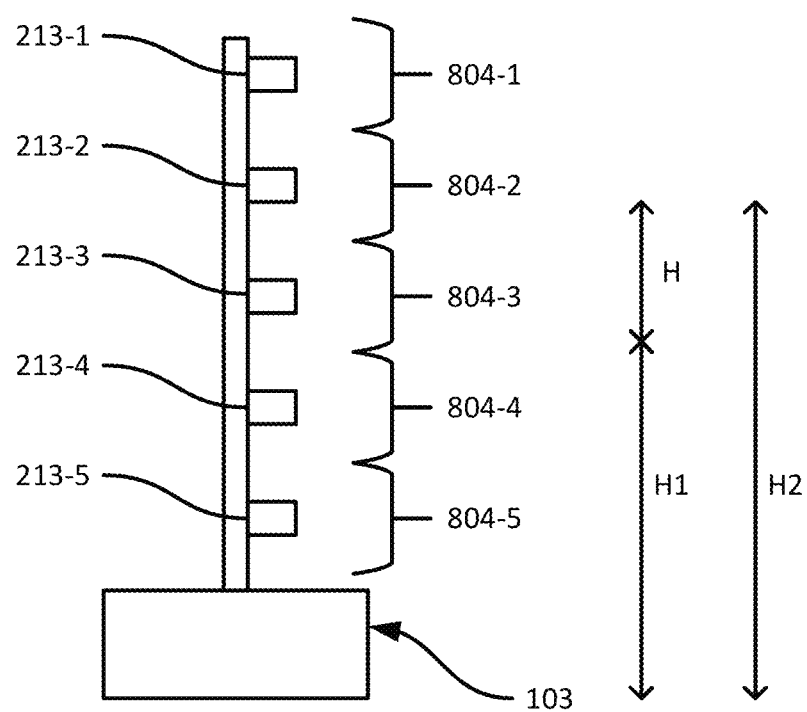

Turning to FIG. 8, example output of a performance of block 525 is shown in the form of a bounding box 800 indicating a face detected by the feature detector 424. As will be apparent to those skilled in the art, various other features may be detected by the feature detector in addition to, or instead of, human faces. For example, the feature detector 424 may be configured to detect eyes (whether human or not). Also shown in FIG. 8 is a confidence level "C" associated with the detected bounding box 800, indicating that a probability of 80% that the box 800 contains a human face.

When the determination at block 525 is affirmative, the processor 400 (and specifically the illumination controller 428) is configured to select an illumination control action at block 530. The illumination control action selected at block 530 serves to mitigate interference by the illumination assemblies 213 with the activities of humans such as customers or workers in the facility in which the apparatus 103 is deployed.

In some examples, the illumination control action selected at block 530 is to dim (i.e. reduce the intensity of) the illumination assemblies 213, or to disable the illumination assemblies 213. In other examples, however, only a subset of the illumination assemblies 213 are dimmed or disabled, according to the position of the feature detected at block 525. For example, the illumination controller 428 can store a range of heights (e.g. as measured from a floor of the facility, according to the frame of reference 102) for each illumination assembly 213. At block 530, the processor 400 can select any illumination assembly 213 with a height range than overlaps with a height range of the feature detected at block 525.

For example, referring again to FIG. 8, the processor 400 can select any illumination assembly 213 that corresponds to a height range that overlaps with the height range "H" defined by the lower edge of the bounding box 800 (at a height H1) and the upper edge of the bounding box 800 (at a height H2). The apparatus 103 is shown in FIG. 8 with five illumination assemblies 213-1 to 213-5, each with a corresponding height range 804-1, 804-2, 804-3, 804-4, and 804-5. The ranges 804 correspond to the extents of the fields of illumination 300 of the illumination assemblies 213. As shown in FIG. 8, the height range H of the feature boundary 800 overlaps with the height ranges 804-2 and 804-3. Therefore, at block 530 the processor 400 can select an illumination control action to dim or disable the illumination assemblies 213-2 and 213-3. Whether the illumination control includes dimming or disabling the selected illumination assemblies can be configured within the illumination controller 428.

Selecting an illumination control action at block 530 can include comparing the confidence level associated with the detected feature to a threshold (e.g. 40%, although various other thresholds may also be employed). If the confidence level exceeds the threshold, the illumination control action is to dim or disable certain illumination assemblies 213. If the confidence level does not exceed the threshold, however, the illumination control action is to return (or maintain) the relevant illumination assemblies 213 to default illumination parameters, discussed below.

Figure 9:
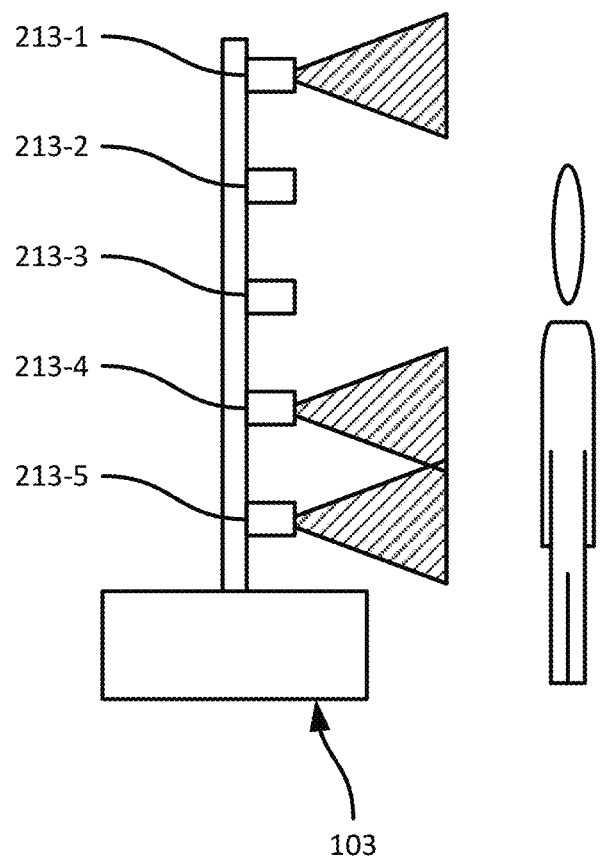
FIG. 9 is a diagram illustrating a performance of block 535 of the method of FIG. 5.

Following selection of the illumination control action at block 530, at block 535 the illumination controller 428 is configured to apply the selected illumination control action to the illumination subsystem. That is, the selected illumination assemblies 213 are dimmed or disabled at block 535. FIG. 9 illustrates an example performance of block 535, in which the illumination assemblies 213-2 and 213-3 have been disabled. The performance of the method 500 can then be repeated for the next data capture at block 505. As will be apparent to those skilled in the art, the processor 400 may also update the path 600 to navigate around any detected obstacles (both human and non-human).

When the determination at block 525 is negative, rather than selecting an illumination control action at block 530, the processor 400 proceeds to block 540 and selects default illumination parameters for the illumination assemblies 213. The default parameters may be stored in the memory 404, and define a greater intensity of illumination for each assembly 213 than the illumination control actions selected at block 530. The processor 400 also proceeds to block 540 following a negative determination at block 515.

In some examples, the processor 400 can implement additional functionality in the selection of an illumination control action. Rather than selecting illumination assemblies for dimming or disabling based on a single detected height of the feature boundary 800, the processor 400 can maintain a persistent set of feature probabilities. The set of probabilities is updated with each feature detection, and the illumination control action is selected based on the set of probabilities. In other words, selection of an illumination control action at block 530 is based not only on the current capture (i.e. the data from the most recent performance of block 505), but also on feature detections from earlier captures. This process may mitigate rapid cycling of illumination assemblies 213 in response to occasional data captures in which an obstacle is not correctly detected. For example, in a series of thirty frames (i.e. thirty performances of block 505) while the apparatus 103 travels along an aisle, a person may be present in the vicinity of the apparatus 103 for all thirty frames but may only be detected in twenty of the frames. The remaining ten frames, lacking a feature detection, may result in illumination assemblies 213 being enabled or increased in intensity, only to be disabled again a fraction of a second later.

Figure 10:
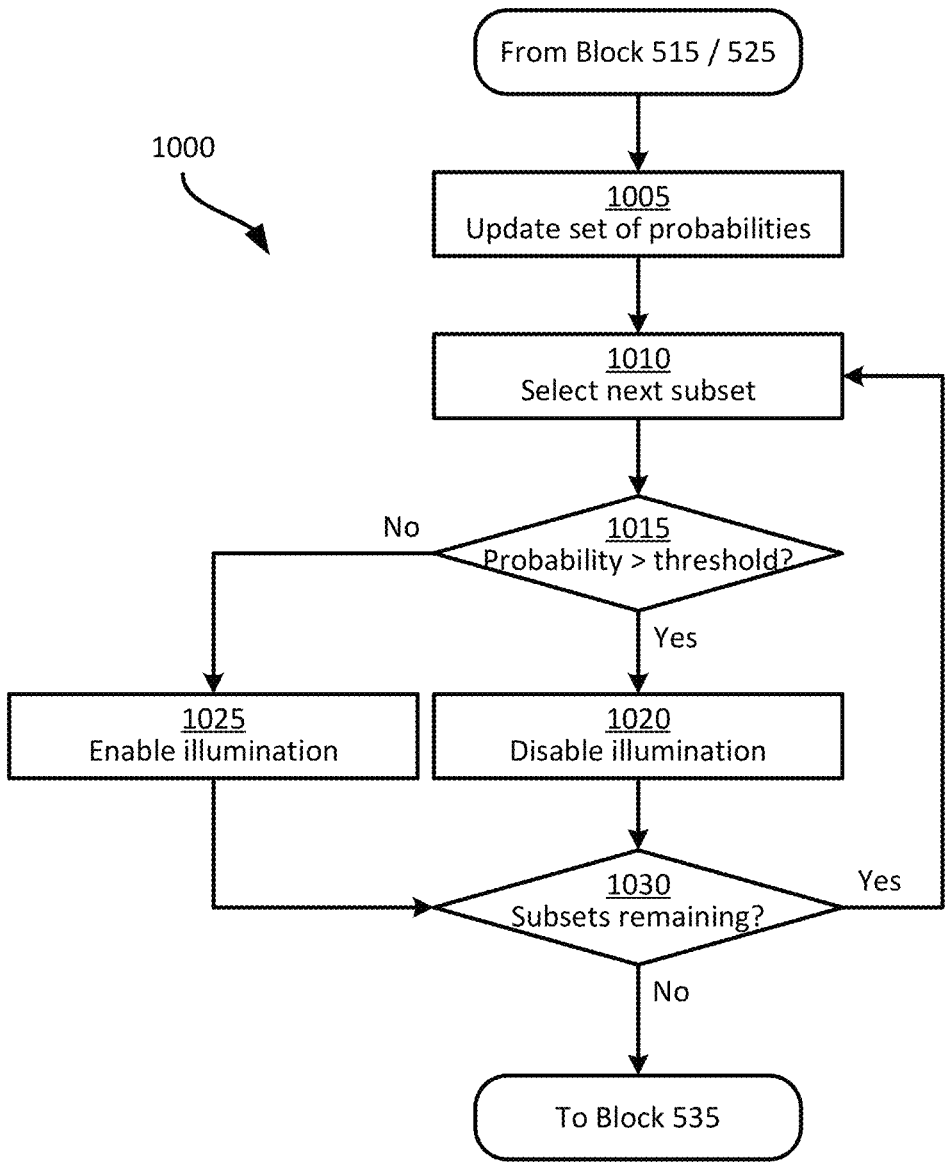
FIG. 10 is a flowchart of a method of selecting illumination control actions.
Figure 11:
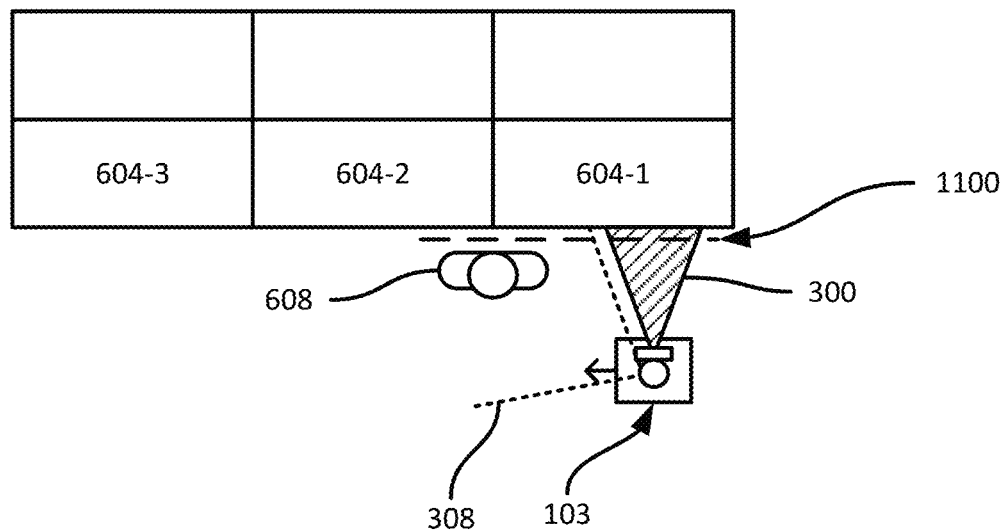
FIG. 11 is a diagram illustrating a performance of block 1005 of the method of FIG. 10.
Figure 11:
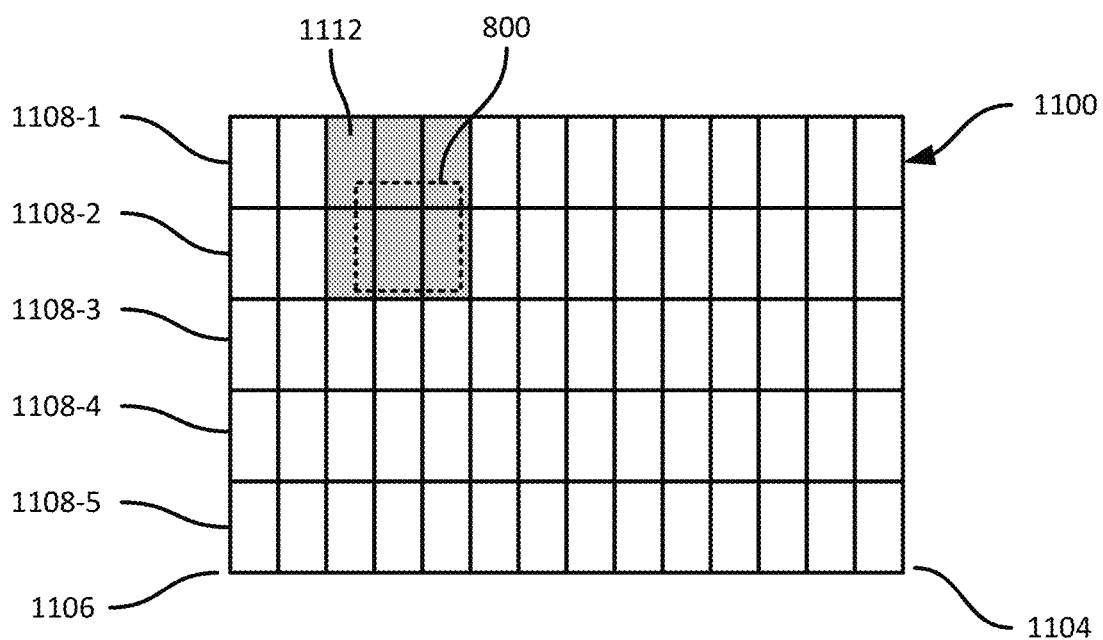

Turning to FIG. 10, a method 1000 of selecting illumination control actions following the detection of human obstacles at block 515 and of obstacle features at block 525 is illustrated. At block 1005, having detected a feature and generated a confidence level associated with the detected feature, the processor 400 is configured to update a set of feature probabilities. In particular, turning to FIG. 11, the processor 400 is configured to maintain a set of probabilities 1100 corresponding to respective positions relative to the apparatus 103. The set of probabilities 1100 is illustrated in FIG. 11 as a grid, parallel to the plane of the modules 604 and extending from a trailing edge 1104 at a predefined distance behind the current location of the apparatus 103 to a leading edge 1106 at a predefined distance ahead of the current location of the apparatus 103. The trailing edge 1104 may be, for example, 10 cm behind the current location (that is, 10 cm opposite the direction of travel of the apparatus 103). The leading edge 1106 may be 50 cm ahead of the current location of the apparatus 103. A wide variety of other distances for the trailing and leading edges 1104 and 1106 may also be employed.

The set of probabilities 1100 includes a subset 1108 corresponding to each height range 804 of the illumination assemblies 213. Thus, in the example shown in FIG. 11, five subsets 1108-1, 1108-2, 1108-3, 1108-4, and 1108-5 are illustrated. Each subset 1108 is further divided into a plurality of cells 1112. Each cell 1112 therefore corresponds to a position along the direction of travel of the apparatus 103, and to a height determined by the subset 1108 of which it is a member. As the apparatus 103 traverses an aisle, trailing cells 1112 are dropped and additional cells 1112 are generated at the leading edge 1106.

To update the set 1100 responsive to a feature detection, the processor 400 is configured to identify the cells 1112 that correspond to the detected position of the feature (i.e. the boundary 800 shown in FIG. 8). As shown in FIG. 11, the shaded cells 1112 that intersect with the boundary 800 (illustrated overlaid on the set 1100) are updated at block 1005.

The update applied to each corresponding cell 1112 can take various forms. For example, a previous probability stored in each cell 1112 (e.g. a default of zero, prior to any updates) can be adjusted according to the confidence level associated with the boundary 800. For example, a previous value in a given cell 1112 can be modified by a difference between the previous value and the current value (e.g. the value of 0.8 shown in FIG. 8). The difference may, in some examples, be weighted by a predefined factor (e.g. 0.6, although smaller and larger factors may also be employed). Thus, if the previous value was zero, the updated value may be 0.48 (that is, the difference between 0.8 and 0, multiplied by the predefined factor of 0.6). Thus, each cell 1112 that is shaded in FIG. 11 may be updated to contain the probability 0.48. In other examples, the factor mentioned above may be omitted, and various other adjustment mechanisms may be employed to update the cells 1112.

As will now be apparent, the set of probabilities 1100 is also updated in the absence of a feature detection (e.g. following a negative determination at block 525), and in the absence of a human obstacle classification (e.g. following a negative determination at block 515). Any cell 1112 that does not correspond to a detected feature (e.g. all the cells 1112 when no human obstacle has been detected) is updated with a current value of zero. Thus, a cell 1112 that previously contained a non-zero probability is adjusted downwards by the current value of zero.

Returning to FIG. 10, at block 1010 the processor 400 is configured to select a subset 1108 from the set 1100. At block 1015 the processor 400 is configured to generate a combined probability from the selected subset 1108. The combined probability can be an average of the values in each cell 1112 of the selected subset 1108. In other examples, the combined probability can be the maximum value among the cells 1112 of the selected subset 1108. In further examples, the processor 400 can generate a weighted average of the cells 1112 of the selected subset 1108, according to any of a variety of weighting functions. For example, cells 1112 at greater distances from the current location of the apparatus 103 may be weighted lower than cells 1112 at smaller distances from the current location of the apparatus 103.

The processor is configured to compare the combined probability to a threshold (e.g. the 40% mentioned above). When the combined probability exceeds the threshold, the processor 400 proceeds to block 1020, at which the illumination assembly 213 corresponding to the selected subset 1008 is disabled or dimmed. When the determination at block 1015 is negative, the illumination assembly 213 corresponding to the selected subset 1008 is enabled or increased in intensity (e.g. to a default intensity) at block 1025.

At block 1030, the processor 400 is configured to return to block 1010 until all subsets 1108 have been processed.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method in a navigational controller, the method comprising:
   obtaining image data and depth data from corresponding sensors of a mobile automation apparatus;
   detecting an obstacle from the depth data and classifying the obstacle as one of a human obstacle and a non-human obstacle;
   in response to the classifying of the obstacle as the human obstacle, selecting a portion of the image data that corresponds to the human obstacle;
   detecting, from the selected portion of image data, a face of the human obstacle;
   based on a detected position of the face of the human obstacle in the selected portion of the image data, selecting an illumination control action for the mobile automation apparatus; and controlling an illumination subsystem of the mobile automation apparatus according to the selected illumination control action, wherein:
  detecting the face includes generating a confidence level associated with the detected position of the face, and
  selecting the illumination control action includes updating, based on the confidence level, a set of feature probabilities corresponding to a height range of the illumination subsystem.

2. The method of claim 1, wherein the illumination control action includes decreasing an illumination intensity of at least one of a plurality of illumination assemblies of the illumination subsystem.

3. The method of claim 2, wherein the illumination control action includes disabling the at least one illumination assembly.

4. The method of claim 1, wherein selecting the illumination control action includes:
  determining, for each of a plurality of subsets of the feature probabilities, whether a combined feature probability exceeds a threshold; and
  when the combined feature probability exceeds the threshold, decreasing an illumination intensity.

5. The method of claim 4, further comprising:
  generating the combined feature probability from the feature probabilities in each of the plurality of subsets.

6. The method of claim 5, wherein generating the combined feature probability includes applying a weighting function to the probabilities of the subset.

7. The method of claim 1, wherein controlling the illumination subsystem includes:
  identifying at least one of a plurality of illumination assemblies corresponding to the detected position of the face; and
  applying the illumination control action to the at least one identified illumination assembly.

8. The method of claim 7, wherein identifying the at least one of the plurality of illumination assemblies includes identifying illumination assemblies that correspond to a height of the detected position of the face.

9. A mobile automation apparatus, comprising:
  an image sensor;
  a depth sensor;
  a chassis supporting an illumination subsystem configured to emit light;
  a navigational controller connected to the image sensor, the depth sensor, and the illumination subsystem, the navigational controller configured to:
    obtain image data and depth data from the image sensor and the depth sensor;
    detect an obstacle from the depth data and classify the obstacle as one of a human obstacle and a non-human obstacle;
    in response to classification of the obstacle as the human obstacle, select a portion of the image data that corresponds to the human obstacle;
    detect, from the selected portion of the image data, a face of the human obstacle;
    based on a detected position of the face of the human obstacle in the selected portion of the image data, select an illumination control action for the mobile automation apparatus; and
    control the illumination subsystem according to the selected illumination control action,
  wherein the navigational controller is further configured to:
    detect the face by generating a confidence level associated with the detected position of the face, and
    select the illumination control action by updating, based on the confidence level, a set of feature probabilities corresponding to a height range of the illumination subsystem.

10. The mobile automation apparatus of claim 9, wherein the illumination control action includes a decrease to an illumination intensity of at least one of a plurality of illumination assemblies of the illumination subsystem.

11. The mobile automation apparatus of claim 10, wherein the illumination control action includes disabling of the at least one illumination assembly.

12. The mobile automation apparatus of claim 9, wherein the navigational controller is configured, in order to select the illumination control action, to:
  determine, for each of a plurality of subsets of the feature probabilities, whether a combined feature probability exceeds a threshold; and
  when the combined feature probability exceeds the threshold, decrease an illumination intensity.

13. The mobile automation apparatus of claim 12, wherein the navigational controller is configured to generate the combined feature probability from the feature probabilities of the subset.

14. The mobile automation apparatus of claim 13, wherein the navigational controller is configured, in order to generate the combined feature probability, to apply a weighting function to the probabilities of the subset.

15. The mobile automation apparatus of claim 9, wherein the navigational controller is configured, in order to control the illumination subsystem, to:
  identify at least one of a plurality of illumination assemblies corresponding to the detected position of the face; and
  apply the illumination control action to the identified at least one illumination assembly.

16. The mobile automation apparatus of claim 15, wherein the navigational controller is configured, in order to identify the at least one of the plurality of illumination assemblies, to identify illumination assemblies that correspond to a height of the detected position of the face.

* * * * *